(12) United States Patent
Sinha et al.

(10) Patent No.: US 10,381,042 B2
(45) Date of Patent: Aug. 13, 2019

(54) METHOD AND SYSTEM FOR GENERATING MULTIMEDIA CLIP

(71) Applicant: Samsung Electronics Co., Ltd., Suwon-si, Gyeonggi-do (KR)

(72) Inventors: Abhishek Sinha, Noida (IN); Aditi Garg, Noida (IN); Shreyas Naphaday, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 14/942,482

(22) Filed: Nov. 16, 2015

(65) Prior Publication Data

US 2016/0140997 A1    May 19, 2016

(30) Foreign Application Priority Data

Nov. 14, 2014 (IN) ............................ 3297/DEL/2014
Nov. 3, 2015 (KR) ........................ 10-2015-0153811

(51) Int. Cl.
| | | |
|---|---|---|
| G11B 27/031 | (2006.01) | |
| G11B 27/30 | (2006.01) | |
| G11B 27/34 | (2006.01) | |

(52) U.S. Cl.
CPC ........ *G11B 27/031* (2013.01); *G11B 27/3081* (2013.01); *G11B 27/34* (2013.01)

(58) Field of Classification Search
CPC .... G11B 27/031; G11B 27/3081; G11B 27/34
See application file for complete search history.

(56) References Cited

U.S. PATENT DOCUMENTS

| | | | | |
|---|---|---|---|---|
| 2003/0158732 A1* | 8/2003 | Pi | ............................ | G01S 13/66 704/251 |
| 2004/0202456 A1* | 10/2004 | Sasagawa | .............. | H04N 5/772 386/333 |
| 2005/0131688 A1* | 6/2005 | Goronzy | ................. | G10L 25/78 704/240 |
| 2005/0163466 A1* | 7/2005 | Liebhold | .............. | G11B 19/022 386/230 |

(Continued)

FOREIGN PATENT DOCUMENTS

EP        2 637 172 A1    9/2013

OTHER PUBLICATIONS

Philips, Philips Hard Disk/DVD Recorder HDR3800 160 GB, Philips Support, accessed Nov. 16, 2015, http://www.p4c.philips.com/cgibin/cpindex.pl?ctn=HDR3800/31&dct=QAC&faqview=1&refdisplay=AVS_DVDR_429&refnr=0067404&scy=NL&slg=ENG.

(Continued)

Primary Examiner — Thai Q Tran
Assistant Examiner — Sunghyoun Park
(74) Attorney, Agent, or Firm — Jefferson IP Law, LLP

(57) ABSTRACT

A method and a device for generating a multimedia clip from multimedia content without interrupting playback of the multimedia content and with no user inputs or at least minimal user inputs are provided. A multimedia content being currently played is stored in a buffer. A current time or a current frame is designated as an end point of the multimedia clip. A start point of the multimedia clip is either computed or received. The multimedia clip is generated by retrieving from the buffer a portion of the multimedia content between the start point and the end point.

11 Claims, 21 Drawing Sheets

(56) References Cited

U.S. PATENT DOCUMENTS

| | | | | |
|---|---|---|---|---|
| 2006/0242550 A1* | 10/2006 | Rahman | ............ | H04N 21/4825 715/203 |
| 2007/0217761 A1* | 9/2007 | Chen | ...................... | H04N 5/772 386/228 |
| 2008/0186319 A1* | 8/2008 | Boner | ................... | G09G 5/393 345/545 |
| 2009/0013252 A1* | 1/2009 | DeWitt | ............... | H04N 21/854 715/716 |
| 2009/0142031 A1* | 6/2009 | Godtland | ............... | G11B 27/28 386/278 |
| 2009/0313038 A1* | 12/2009 | Machtelinck | .......... | G06Q 10/02 705/2 |
| 2010/0027963 A1* | 2/2010 | Shiitani | ................ | G11B 27/105 386/241 |
| 2010/0071013 A1* | 3/2010 | Vandermolen | ......... | H04H 60/33 725/109 |
| 2010/0123727 A1* | 5/2010 | Kwa | .................... | G09G 3/3611 345/522 |
| 2012/0050318 A1* | 3/2012 | Khasnis | ................ | G11B 27/28 345/625 |
| 2012/0084455 A1* | 4/2012 | McCue | ................ | H04N 21/235 709/231 |
| 2012/0177256 A1* | 7/2012 | Keefe | ................... | G06F 19/322 382/115 |
| 2015/0098686 A1* | 4/2015 | Obukhov | ......... | G08B 13/19656 386/226 |

OTHER PUBLICATIONS

Adobe Systems, Adobe Premiere Pro CC: Overview, 2015, accessed Nov. 16, 2015, http://www.adobe.com/in/products/premiere.html.

* cited by examiner

METHOD AND SYSTEM FOR GENERATING MULTIMEDIA CLIP

CROSS-REFERENCE TO RELATED APPLICATION(S)

This application claims the benefit under 35 U.S.C. § 119(a) of an Indian patent application filed on Nov. 14, 2014 in the Indian Patent Office and assigned Serial No. 3297/DEL/2014, and of a Korean patent application filed on Nov. 3, 2015 in the Korean Intellectual Property Office and assigned Serial No. 10-2015-0153811, the entire disclosure of each of which is hereby incorporated by reference.

TECHNICAL FIELD

The present disclosure relates to a method and a system for generating multimedia clip from a multimedia content. More particularly, the present disclosure relates to a method and a system for generating a multimedia clip from multimedia content without interrupting multimedia playback and with minimal user input.

BACKGROUND

Multimedia content like audio, video, flash, etc. have become a key source of entertainment over the years. The popularity of multimedia content has given rise to many multimedia manipulation features like reverse, forward, pause, play, generating multimedia clips or snippets, etc. Such multimedia manipulation features are available in many multimedia manipulation tools known in the art. These known multimedia manipulation tools may be utilized by a user for many purposes. For example, while viewing a multimedia content, the user may want to store at least part of a recently played content in the form of a multimedia clip. In such a case, the user first needs to pause or stop multimedia playback, and then mark a start point and an end point of a multimedia clip that user desires to generate. For this purpose, the user may need to rewind or re-play the multimedia content. Further, the user may need to provide various other inputs, such as a location to store the multimedia clip.

Patent document EP2637172A1 discloses a video editing apparatus and method for guiding video feature information. During video editing, video contents are analyzed to detect at least one piece of video feature information, and video content sections in which the at least one piece of video feature information is detected are displayed together on an editing screen, thereby providing a video editing guide to a user.

A first problem in known multimedia clipping tools is that a user has to first interrupt multimedia playback in order to generate a multimedia clip from multimedia content being played, and then rewind or re-play the multimedia content to mark start and end points for the multimedia clip. A second problem is that the user has to bear the burden of providing various inputs, such as the start and end points, a location to store the multimedia clip, etc. A third problem is that the known multimedia clipping tools cannot be utilized in case the multimedia content is for live or broadcasted content because the user cannot rewind the multimedia content or play it again in such a case. Even if there is a facility to record the live or broadcasted content that circumvents the third problem, the first and second problems still remain. Therefore, with the known multimedia clipping tools, only recorded content can be used for multimedia clip generation. Further, the user has to disturb multimedia playback and provide various inputs for multimedia clip generation like start and end points, a location to store the multimedia clip, etc.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for generating a multimedia clip from a multimedia content.

In accordance with the purposes of the disclosure, embodiments of the present disclosure as embodied and broadly described herein, are based on the idea that in most cases, a decision to save a desired multimedia clip is received at the end point of the desired multimedia clip. The time/frame at which an instruction to generate the desired multimedia clip is provided either automatically or by a user, that particular time/frame is designated as the end point of the desired multimedia clip. The start point of the desired multimedia clip may be received from an external sensor, an internal sensor, or may be computed based on data provided by one of them. Alternatively, the start point of the desired multimedia clip may be computed based on a predefined duration for the desired multimedia clip. Alternatively, the start point of the desired multimedia clip may be computed or received based on a user input. The currently playing portion of the multimedia content is stored in a buffer from where the desired multimedia clip may be generated based on the start point and the end point. In this way, embodiments of the present disclosure facilitate generation of multimedia clips fully automatically based on some external/internal trigger or semi-automatically/manually based on user trigger, without stopping or pausing currently played content. Further, the multimedia clips may be generated from live/broadcasted/streaming or stored/recorded content taking no or at least minimal inputs from the user. Further, the multimedia clips may be automatically stored to a predefined location or a user-specified location provided on the fly.

In accordance with an aspect of the present disclosure, a method of generating a multimedia clip from multimedia content is provided. The method includes storing, in a buffer, multimedia content being currently played, designating a current time or a current frame as an end point of the multimedia clip, determining a start point of the multimedia clip, and generating the multimedia clip by retrieving from the buffer a portion of the multimedia content between the start point and the end point, wherein the storing, the designating, the determining, and the generating are performed while the multimedia content is being played.

In accordance with another aspect of the present disclosure, a device for generating a multimedia clip from multimedia content is provided. The device includes a storage unit configured to temporarily store multimedia content being currently played, a controller configured to designate a current time or a current frame as an end point of the multimedia clip, determine a start point of the multimedia clip, retrieve, from the storage unit, a portion of the multimedia content between the start point and the end point, and generate the multimedia clip by using the portion, wherein the controller generates the multimedia clip while the multimedia content is being played.

In accordance with another aspect of the present disclosure, a non-transitory computer-readable recording medium is provided. The non-transitory computer-readable recording medium has recorded thereon a program, which when executed by a computer, performs the method above.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
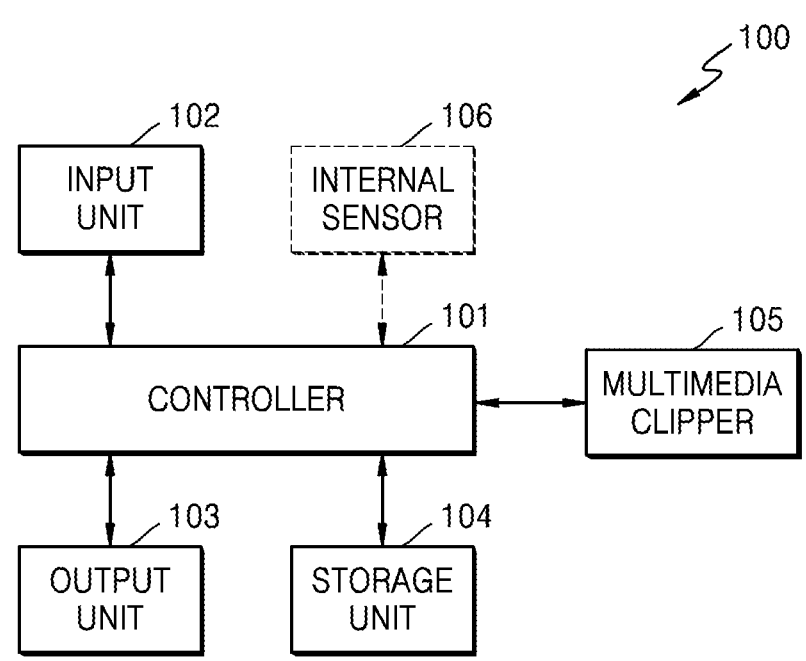
FIG. 1 illustrates a system for clipping multimedia according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment of the present disclosure, a method of generating a multimedia clip from multimedia content is provided. The method may include: storing multimedia content being currently played in a buffer, designating a current time or a current frame as an end point of the multimedia clip, computing or receiving a start point of the multimedia clip, and generating the multimedia clip by retrieving from the buffer a stored portion of the multimedia content between the start point and the end point, wherein the storing, the designating, the computing or receiving, and the generating are performed without interrupting playback of the multimedia content.

In an embodiment of the present disclosure, the method may further include receiving an instruction to generate the multimedia clip at the current time or the current frame.

In an embodiment of the present disclosure, the end point may be designed through at least one of an external sensor or an internal sensor in an automatic clipping mode.

In an embodiment of the present disclosure, the instruction may be received through an external sensor or an internal sensor in an automatic clipping mode.

In an embodiment of the present disclosure, the instruction may be received through an external sensor, an internal sensor, or a user interface in a semi-automatic clipping mode.

In an embodiment of the present disclosure, the instruction may be received through a user interface unit in a manual clipping mode.

In an embodiment of the present disclosure, the method may further include storing the multimedia clip at a predefined storage location or a user-specified location provided on the fly.

In an embodiment of the present disclosure, the receiving of the start point may include designating the start point by using a predefined duration fetched from a configuration file in an automatic clipping mode.

In an embodiment of the present disclosure, the computing of the start point may include computing the start point by using the end point and a duration of the multimedia clip as received from an external sensor or an internal sensor in an automatic clipping mode.

In an embodiment of the present disclosure, the computing of the start point may include computing the start point by using the end point and a predefined duration of the multimedia clip in a semi-automatic clipping mode, wherein the end point is designated based on an input received from a user interface.

In an embodiment of the present disclosure, the receiving of the start point may include receiving the start point from an external sensor or an internal sensor based on a second set of rules in a semi-automatic clipping mode, wherein the end point is designated based on an input received from the external sensor or the internal sensor.

In an embodiment of the present disclosure, the computing or receiving of the start point may include computing or receiving the start point based on an input received from a user interface mode in a semi-automatic clipping mode.

In an embodiment of the present disclosure, the receiving of the start point may include receiving the start point as an input received from a user interface in a manual clipping mode, the input being one of a graphical user interface based on input, a text input, a gesture input, a voice input, and any other suitable input mechanisms.

In an embodiment of the present disclosure, the text input may be for a duration, a starting time, or a starting frame number of the multimedia clip.

In an embodiment of the present disclosure, a method for automatically generating a multimedia clip from multimedia clip content is provided. The method may include storing multimedia clip content being currently played in a buffer, generating, based on a first set of rules, an instruction to generate the multimedia clip, designating a current time or a current frame as an end point of the multimedia clip on receiving the instruction, computing or receiving a start point of the multimedia clip, and generating the multimedia clip by retrieving from the buffer a stored portion of the multimedia content between the start point and the end point, wherein the storing, the generating of the instruction, the designating, and the generating of the multimedia clip are performed without interrupting playback of the multimedia clip content.

In an embodiment of the present disclosure, the first set of rules that are predefined may include one or more rules for designating the start point of the multimedia clip or generating the instruction to generate the multimedia clip.

In an embodiment of the present disclosure, a second set of rules that are predefined may include one or more rules for designating the start point of the multimedia clip.

In an embodiment of the present disclosure, a method of semi-automatically generating a multimedia clip from multimedia content is provided. The method may include storing multimedia content being currently played in a buffer, designating a current time or a current frame as an end point of the multimedia clip, designating a start point of the multimedia clip, and generating the multimedia clip by retrieving from the buffer a stored portion of the multimedia content between the start point and the end point, wherein the storing, the designating of the current time or the current frame, the designating of the start point, and the generating are performed without interrupting playback of the multimedia content, and wherein either of the start point or the end point is designated based on a manual input while the other is not designated based on a manual input.

In an embodiment of the present disclosure, a method of semi-automatically generating a multimedia clip from multimedia clip content is provided. The method may include storing multimedia content being currently played in a buffer, designating a current time or a current frame as an end point of the multimedia clip, computing, based on a predefined duration of the multimedia clip and the end point, a start point of the multimedia clip, and generating the multimedia clip by retrieving from the buffer a stored portion of the multimedia content between the start point and the end point, wherein the storing, the designating, the computing, and the generating are performed without interrupting playback of the multimedia content.

In an embodiment of the present disclosure, the method may further include receiving an instruction to generate the multimedia clip at the current time or the current frame from a user interface.

In an embodiment of the present disclosure, the method may further include accessing a configuration file to fetch the predefined duration of the multimedia clip.

In an embodiment of the present disclosure, a method of semi-automatically generating a multimedia clip from multimedia content is provided. The method may include storing multimedia content currently played in a buffer, generating, based on a first set of rules, an instruction to generate the multimedia clip, designating a current time or a current frame as an end point of the multimedia clip according to the instruction, computing or receiving, based on an input received from a user interface, a start point of the multimedia clip, and generating the multimedia clip by retrieving from the buffer a stored portion of the multimedia content between the start point and the end point, wherein the storing, the generating of the instruction, the designating, the computing or receiving, and the generating of the multimedia clip are performed without interrupting playback of the multimedia content.

In an embodiment of the present disclosure, the input may be a duration, a starting time, or a starting frame number of the multimedia clip.

In an embodiment of the present disclosure, the input may be one of a graphical user interface based input, a text input, a gesture input, and a voice input.

In an embodiment of the present disclosure, a method of semi-automatically generating a multimedia clip from multimedia content is provided. The method may include storing multimedia content being currently played in a buffer, designating, based on a user input, a current time or a current frame as an end point of the multimedia clip, automatically designating a start point of the multimedia clip based on a second set of rules, and generating the multimedia clip by retrieving from the buffer a stored portion of the multimedia content between the start point and the end point, wherein the storing, the designating, the automatically designating, and the generating are performed without interrupting playback of the multimedia content and either of the start point or the end point is designated based on a manual input while the other is not designated based on a manual input.

In an embodiment of the present disclosure, the method may further include receiving an instruction to generate the multimedia clip at the current time or the current frame from a user interface.

In an embodiment of the present disclosure, the input may be a duration, a starting time, or a starting frame number of the multimedia clip.

In an embodiment of the present disclosure, the input may be one of a graphical user interface based input, a text input, a gesture input, and a voice input.

In an embodiment of the present disclosure, a system for generating a multimedia clip from multimedia content is provided. The system may include a controller configured to control an operation of the system, a storage unit configured to store multimedia content being currently played in a buffer, and a multimedia clipper configured to designate a current time or a current frame as an end point of the multimedia clip, compute or receive a start point of the multimedia clip, and generate the multimedia clip by retrieving from the buffer a stored portion of the multimedia content between the start point and the end point, wherein functions of the system are performed without interrupting playback of the multimedia content. Also, the start point and the end point are designated based on a manual input, but other functions are not based on a manual input.

In an embodiment of the present disclosure, a method for manually generating a multimedia clip from multimedia content is provided. The method may include storing multimedia content being currently played in a buffer, designating a current time or a current frame as an end point of the multimedia clip, computing or receiving, based on an input received from a user interface, a start point of the multimedia clip, and generating the multimedia clip by retrieving from the buffer a stored portion of the multimedia content between the start point and the end point, wherein the storing, the designating, the computing or receiving, and the generating are performed without interrupting playback of the multimedia content.

In an embodiment of the present disclosure, the method may further include receiving an instruction to generate the multimedia clip at the current time or the current frame from a user interface.

In an embodiment of the present disclosure, the input may be a duration, a starting time, or a starting frame number of the multimedia clip.

In an embodiment of the present disclosure, the input may be one of a graphical user interface based inputs, a text input, a gesture input, and a voice input.

In an embodiment of the present disclosure, a system for generating a multimedia clip from multimedia content is provided. The system may include a controller configured to control an operation of the system, a storage unit configured to store multimedia content being currently played in a buffer, and a multimedia clipper configured to designate a current time or a current frame as an end point of the multimedia clip, compute or receive a start point of the multimedia clip, and generate the multimedia clip by retrieving from the buffer a stored portion of the multimedia content between the start point and the end point, wherein functions of the system are performed without interrupting playback of the multimedia content.

In an embodiment of the present disclosure, the system may further include an input unit configured to receive an input to generate the multimedia clip at the current time or the current frame, wherein the input is received from a user interface in a manual mode or from at least one of an external sensor and an internal sensor in an automatic clipping mode.

In an embodiment of the present disclosure, the system may further include an output unit configured to play the multimedia content.

In an embodiment of the present disclosure, the instruction may be received from an external sensor or an internal sensor in an automatic clipping mode.

In an embodiment of the present disclosure, the instruction may be received from an external sensor, an internal sensor, or a user interface unit in a semi-automatic clipping mode.

In an embodiment of the present disclosure, the instruction may be received from a user interface in a manual clipping mode.

In an embodiment of the present disclosure, the multimedia clipper may further include a detection module configured to detect a trigger for generating the multimedia clip, a selector module configured to deal with the start point and the end point of the multimedia clip, a presentation module configured to provide user interfaces for interaction with the user, a buffer module configured to manage the buffer, a clipping module configured to generate and store the multimedia clip, and a frame grabber module configured to act as interface between the buffer module and the presentation module as well as the clipping module.

In an embodiment of the present disclosure, settings for the multimedia clipper may be stored in a configuration file, wherein the configuration file may include a predefined duration of the multimedia clip, a predefined start time, a predefined starting frame number, a thumbnail size, a number of thumbnails to be shown, a buffer size, a buffer location, a predefined location, and a uniform resource locator (URL) along with credentials for direct uploading on a social networking website.

In an embodiment of the present disclosure, the multimedia clipper may receive the start point from an external sensor or an internal sensor in an automatic clipping mode.

In embodiment of the present disclosure, the multimedia clipper may compute the start point by using the end point and a predefined duration of the multimedia clip as received from an external sensor or an internal sensor in an automatic clipping mode.

In an embodiment of the present disclosure, the multimedia clipper may compute the start point by using the end point and a predefined duration of the multimedia clip in a semi-automatic clipping mode, wherein the end point is designated based on an input received from a user interface.

In an embodiment of the present disclosure, the multimedia clipper may compute the start point by using a second set of rules in a semi-automatic clipping mode, wherein the end point is designated based on an input received from a user interface.

In an embodiment of the present disclosure, the multimedia clipper may compute or receive the start point based on an input received from a user interface in a semi-automatic clipping mode, wherein the end point is designated based on an input from an external sensor or an internal sensor.

In an embodiment of the present disclosure, the multimedia clipper may compute the start point by using the end point and a duration of the multimedia clip received from a user interface in a manual clipping mode.

In an embodiment of the present disclosure, the multimedia clipper may receive, through a user interface, the start point as an input in a manual clipping mode, the input being one of a graphical user interface based input, a text input, a gesture input, a voice input, and any suitable inputs.

In an embodiment of the present disclosure, the text input may be for one of a duration, a starting time, or a starting frame number of the multimedia clip.

In an embodiment of the present disclosure, a system of automatically generating a multimedia clip from multimedia content is provided. The system may include a controller configured to control an operation of the system, an internal sensor configured to generate, based on a first set of rules, an instruction to generate the multimedia clip, a storage unit configured to store multimedia content being currently played, in a buffer, and a multimedia clipper configured to designate a current time or a current frame as an end point of the multimedia clip according to the instruction from the internal sensor, compute a start point of the multimedia clip, and generate the multimedia clip by retrieving from the buffer a stored portion of the multimedia content between the start point and the end point, wherein functions of the system are performed without interrupting playback of the multimedia content.

In an embodiment of the present disclosure, the system may further include an input unit for receiving the instruction from the internal sensor to generate the multimedia clip at the current time or the current frame.

In an embodiment of the present disclosure, the multimedia clipper may compute the start point by computing one of a duration, a starting time, or a starting frame number of the multimedia clip based on a second set of rules.

In an embodiment of the present disclosure, a system for semi-automatically generating a multimedia clip from multimedia content is provided. The system may include a controller configured to control an operation of the system, a storage unit configured to store multimedia content being currently played, in a buffer, and a multimedia clipper configured to designate a current time or a current frame as an end point of the multimedia clip, designate a start point of the multimedia clip, and generate the multimedia clip by retrieving from the buffer a stored portion of the multimedia content between the start point and the end point, wherein functions of the system are performed without interrupting playback of the multimedia content, and either of the start point or the end point is designated based on manual input while the other is not designated based on manual input.

In an embodiment of the present disclosure, a system of semi-automatically generating a multimedia clip from multimedia content is provided. The system may include a controller configured to control an operation of the system, a storage unit configured to store multimedia content being currently played, in a buffer, and a multimedia clipper configured to designate a current time or a current frame as an end point of the multimedia clip, compute a start point of the multimedia clip based on a predefined duration of the multimedia clip and the end point, and generate the multimedia clip by retrieving from the buffer a stored portion of the multimedia content between the start point and the end point, wherein functions of the system are performed without interrupting playback of the multimedia content.

In an embodiment of the present disclosure, the system may further include an input unit configured to receive an instruction to generate the multimedia clip at the current time or the current frame from a user interface.

In an embodiment of the present disclosure, the multimedia clipper may access a configuration file stored in the storage unit to fetch the predefined duration of the multimedia clip.

In an embodiment of the present disclosure, a system for semi-automatically generating a multimedia clip from multimedia content is provided. The system may include a controller configured to control an operation of the system, an internal sensor or a unit configured to generate, based on a first set of rules, an instruction to generate the multimedia clip, a storage unit configured to store multimedia content being currently played, in a buffer, and a multimedia clipper configured to designate a current time or a current frame as an end point of the multimedia clip according to the instruction from the internal sensor, compute or receive a start point of the multimedia clip based on an input received from an user interface, and generate the multimedia clip by retrieving from the buffer a stored portion of the multimedia content between the start point and the end point, wherein functions of the system are performed without interrupting playback of the multimedia content.

In an embodiment of the present disclosure, the system may further include an input unit configured to receive the instruction from the internal sensor to generate the multimedia clip at the current time or the current frame.

In an embodiment of the present disclosure, the input may be a duration, a starting time, or a starting frame number of the multimedia clip.

In an embodiment of the present disclosure, the input may be one of a graphical user interface based input, a text input, a gesture input, a voice input, and any suitable inputs.

In an embodiment of the present disclosure, a system for manually generating a multimedia clip from multimedia content is provided. The system may include a controller configured to control an operation of the system, a storage unit configured to store multimedia content being currently played, in a buffer, and a multimedia clipper configured to designate a current time or a current frame as an end point of the multimedia clip, compute or receive a start point of the multimedia clip based on an input received from a user interface, and generate the multimedia clip by retrieving from the buffer a stored portion of the multimedia content between the start point and the end point, wherein functions of the system are performed without interrupting playback of the multimedia content.

In an embodiment of the present disclosure, the system may further include an input unit configured to receive an instruction to generate the multimedia clip at the current time or the current frame of the multimedia content from the user interface.

In an embodiment of the present disclosure, the input may be a duration, a starting time, or a starting frame number of the multimedia clip.

In an embodiment of the present disclosure, the input may be one of a graphical user interface based input, a text input, a gesture input, a voice input, and any suitable inputs.

It will be understood that although the terms "first", "second", etc. may be used herein to describe various components, these components should not be limited by these terms. These components are only used to distinguish one component from another.

In the present disclosure, when a region is "connected" to another region, the regions may not only be "directly connected", but may also be "electrically connected" via another device therebetween. Also, when a region "includes" an element, the region may further include another element instead of excluding the other element, otherwise differently stated.

The term "the" or similar referring expressions used in the present disclosure, specifically in the claims, may denote both the singular and the plural. When a certain embodiment may be implemented differently, a specific process order may be performed differently from the described order. For example, two consecutively described processes may be performed substantially at the same time or performed in an order opposite to the described order.

Appearances of the phrase "in an embodiment", "in another embodiment" and similar language throughout the present disclosure may, but do not necessarily, all refer to the same embodiment.

Various embodiments of the present disclosure may be described in terms of functional block components and various processing operations. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of techniques according to the related art for electronics configuration, signal processing and/or control, data processing and the like. The words "mechanism" and "element" are used broadly and are not limited to mechanical or physical embodiments of the present disclosure, but can include software routines in conjunction with processors, etc.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the present disclosure will be described with reference to accompanying drawings.

The following description describes methods and systems with reference to the accompanying drawings for generating a multimedia clip from a multimedia content like audio, video, flash, etc. without affecting the playback of the multimedia content by taking either no or at least minimal inputs from a user. Embodiments of the present disclosure may be used in a scenario, for example, where the user while watching the multimedia content wishes to generate, store, and/or share a multimedia clip from the multimedia content being played. In another scenario, an external sensor may trigger generation of the multimedia clip in a fully automatic manner. In every scenario, the multimedia clip is generated without disturbing the currently playing content with no or at least minimal inputs from the user according to the present disclosure.

It is observed that in most of the cases, a decision to generate and save the multimedia content is received near the end point of a desired multimedia clip. A multimedia clip is generated as a start point and an end point are determined. As per embodiments of the present disclosure, when the user is watching the multimedia content and any external trigger or the user only activates multimedia clipping, a current frame or time may be designated as the end point of a multimedia clip to be saved. Either the start point is computed based on an input from any external sensor in an automatic mode or the predefined clip duration is used to compute the start point of the multimedia clip in a semi-automatic mode. In a manual mode, the user may change the start point either by modifying the duration of the clip or explicitly changing the start point by providing a starting time or a starting frame. The user may provide inputs in form of one or more of user interface based inputs, text inputs, gesture inputs, voice, or any suitable inputs. Based on the start and end points and a configuration file, the multimedia clip is generated and stored at a user specified or predefined storage location. Accordingly, this process may be called reverse clipping as the end point is known and the start point is either computed or received as an input from the user or from a sensor. The sensor may be implemented external or internal to the system.

As per one aspect of the present disclosure, the clipping processes completely works at its own, taking trigger for clip generation from an external/internal sensor which may include software, hardware, or a combination thereof capable of detecting, analyzing, or reporting situations. The external/internal sensor may include one or more of mood detectors, surveillance cameras, image processors, etc., which keep track of the end point and/or the start point/clip duration for the clip generation based on a first set and a second set of rules respectively. These rules may be understood through the following example. It may be assumed that a security system is serving the purpose of the external/internal sensor in one example. The security system includes a surveillance camera and an image processor that is coupled with the surveillance camera. The security system may be configured to generate a trigger to generate a multimedia clip based on a first set of predefined rules. The first set of predefined rules includes any predefined rule which requires a multimedia clip of a recent content to be generated. Examples of such predefined rules include, but are not limited to generating the trigger (1) when any unusual activity is performed by a subject, (2) when a scene being captured changes more than a threshold percentage, or (3) when an audio at the scene being captured stops. The first set of rules is basically to designate an end point of the multimedia clip and to start reverse clipping process. Similarly, a second set of predefined rules is provided to designate a start point of the multimedia clip. The second set of predefined rules includes any predefined rule which defines a start point of the multimedia clip. In continuation to the examples given for first set of rules, the examples of second set of predefined rules include, but are not limited to designating a start point at a frame or time (1) when the subject came into the scene, (2) when the scene being captured started changing, or (3) when the audio at the scene being captured starts.

As per a second aspect of the present disclosure, the multimedia clip of a predefined duration is saved at a predefined location or a user-specified location provided on the fly in a semi-automatic manner, the only user input being an instruction to generate a multimedia clip. In this way, the end point of the multimedia clip is provided by the user while the start point is computed based on the predefined duration or the second set of rules. Alternatively, the end point of the multimedia clip may be provided by the internal/external sensor based on the first set of rules while the start point be computed or received based on a user input. All such possibilities fall within the scope of semi-automatic generation of the multimedia clip according to the present disclosure.

As per a third aspect of the present disclosure, if a user wants to change only the duration/start time/start frame of the multimedia clip, then a corresponding duration input is received from the user in this manual mode. The multimedia clip as per said corresponding duration input is generated and saved at predefined location or a user-specified location provided on the fly in this manual mode.

As per a fourth aspect of the present disclosure, a user may want to manually fine tune the start point of the clip. For this purpose, a sequence of frame thumbnails is displayed to the user. The middle thumbnail of the sequence is highlighted as a start frame and the user may traverse through the sequence to select a desired start frame. The user may provide this input using any mechanism which is available with the device like a touchscreen, a gesture, a voice input, a textual entry, or any other suitable input.

In an embodiment, the present disclosure may be implemented in a system for generating a multimedia clip from a multimedia content such that multimedia playback is not interrupted while generating the multimedia clip from the multimedia content.

FIG. 1 illustrates such a system for clipping multimedia according to an embodiment of the present disclosure.

Referring to FIG. 1, a system 100 may include a device for generating a multimedia clip. Examples of the system 100 include but are not limited to a television (TV), a stand-alone or distributed or web computing systems, a set-top box, multimedia playing devices, etc. Here, the multimedia content may be a live/broadcasted/streaming or stored/recorded multimedia. As shown in FIG. 1, the system 100 includes a controller 101. The controller 101 controls an overall operation of the system 100 for the generating the multimedia clip and communicates with the other components of the system 100. The controller 101 may be implemented in the form of one or more microcontrollers or central processing units. In addition to the controller 101, the system may include an input unit 102, an output unit 103, a storage unit 104, a multimedia clipper 105, and an internal sensor 106.

The input unit 102 may receive user inputs, external inputs, or sensor inputs, for example, an instruction to generate the multimedia clip at a current time or frame of the multimedia content. Examples of the input unit 102 include, but are not limited to an input port, a touchscreen display, a stylus, a digital pen, a microphone, and a camera. The multimedia content may be played on the output unit 103, such as an audio speaker or a display screen. In one implementation, an output device may be capable of taking identifiable inputs. One example of the output device includes, but is not limited to a touchscreen display. In other words, the touchscreen display may work as both the input unit 102 and the output unit 103. In one implementation, the output unit 103 may not be provided to the system 100, such as a set-top box. In such cases, the output unit 103 may be external to the system 100. Further, the storage unit 104 stores a currently playing portion of the multimedia content in a buffer, which is basically a temporary storage of a limited size as per requirements and a predefined storage location.

The input unit 102 may receive a clipping instruction and related inputs from an external sensor (not shown) or the internal sensor 106 in a fully automatic clipping mode or a semi-automatic mode. This external sensor/internal sensor may be a software module, hardware, or a combination thereof, which provides one or more clipping inputs in automatic or semi-automatic clipping mode, which are otherwise provided by a user in a manual clipping mode. Examples of such inputs include an input to designate an end point and/or a start point of a multimedia clip to be generated. Instead of the software/hardware module, one or more sensors may be provided for the same purpose. In one example, a closed-circuit TV (CCTV) in association with a digital image processor may be used to work as the external sensor or the internal sensor 106. The other examples of the external sensor and the internal sensor 106 include, but are not limited to a mood detector, a surveillance camera, an image processor, and combinations thereof.

Alternatively, the input unit 102 may receive the clipping instruction and related inputs from a user interface unit (not shown). The current time or the current frame is when the clipping instruction is received. The multimedia clipper 105 designates the current time or frame as an end point of the multimedia clip. The multimedia clipper 105 may compute or receive a start point of the multimedia clip. For this purpose, the multimedia clipper 105 may receive one or more clipping inputs from the external sensor, the internal sensor 106, or the user. Further, the multimedia clipper 105 generates the multimedia clip by retrieving from the buffer the stored portion of the multimedia content within the start point and the end point. The multimedia clip is generated such that no interruption is observed on the currently playing content. In one implementation, the multimedia clipper 105 may generate the multimedia clip from the multimedia content under a control of a program. The program may be implemented in a dedicated hardware, such as a programmable chip/integrated chip (IC), or through software. In FIG. 1, the multimedia clipper 105 is described to be a separate unit from the controller 101, but an embodiment of the present disclosure is not limited thereto. Some or all functions of the multimedia clipper 105 may be realized by the controller 101.

Figure 2:
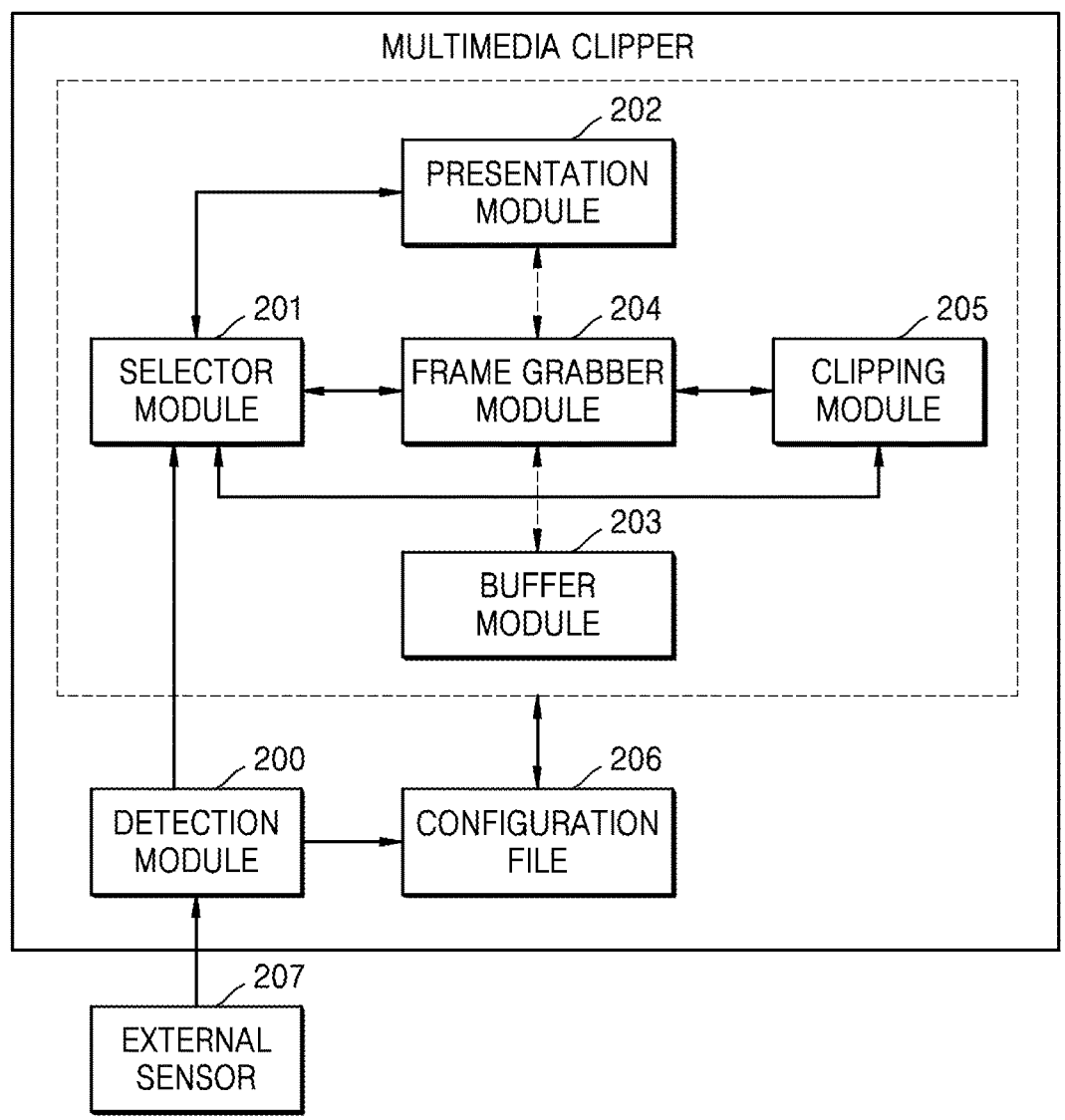
FIG. 2 illustrates a block diagram of a multimedia clipper for clipping multimedia according to an embodiment of the present disclosure.

FIG. 2 illustrates a block diagram of a multimedia clipper for clipping multimedia according to an embodiment of the present disclosure.

Referring to FIG. 2, a multimedia clipper, such as the multimedia clipper 105 of FIG. 1, may include a detection module 200 that receives user commands and initiates the clipping process, a selector module 201 that deals with start and end points for clip generation, a presentation module 202 that provides a user interface for the clip generation, a buffer module 203 that handles a buffer, i.e., a temporary storage for the clip generation, a frame grabber module 204 that acts as an interface between the buffer module 203 and other modules, a clipping module 205 that is responsible for the clip generation and storage, and a configuration file 206 that provides settings as per user preference. Each component of the multimedia clipper is described below in more detail.

The detection module 200 receives a trigger to initiate the clipping process. In one implementation, the detection module 200 receives the trigger and related inputs from a user. In another implementation, the detection module 200 receives the trigger and related inputs from an external sensor 207 or the internal sensor (e.g., 106 in FIG. 1). Further, the detection module 200 may be inbuilt to the selector module 201.

The selector module 201 deals with the start and end points for the clip generation. For this purpose, the detection module 200 keeps track of triggers initiated by the user, the external sensor 207 or the internal sensor.

A user trigger for the clipping process may be given directly through interface of the system or through some other input source, such as an input unit (e.g., 102 in FIG. 1), which may be recognized and uniquely identified by the detection module 200. In one implementation, this identifiable input may be received through a remote, a touchscreen, a gesture, a voice input, or any other compatible device and communicated to the selector module 201 by the detection module 200. Further, the selector module 201 invokes the presentation module 202 upon a user request for clip generation, to receive a user input. After receiving the user input, the selector module 201 accesses the configuration file 206 to fetch default value for calculating start point. The time when clipping is requested by the user is treated as the end point. If duration is provided then the start point is calculated by subtracting the duration from the end point. Any change made in the start point by the user is tracked and saved by the selector module 201. Upon finalization of the start point the selector module 201 invokes the clipping module 205 for clip generation with the final start and end points.

In automatic mode, the external sensor 207 or the internal sensor 106 triggers the clipping process, then the selector module 201 receives the end point along with either start point or duration from the external sensor 207 or the internal sensor 106. In one implementation, a sensor may only provide an end point and a pre-defined duration is received from the configuration file 206. The selector module 201 directly invokes the clipping module 205 for clip generation with start and end points and all remaining required settings are received from the configuration file 206.

In one implementation of the semi-automatic mode, the selector module 201 receives the end point from the user and the start point is received from the configuration file or is received from a sensor based on second set of rules.

While in another implementation of semi-automatic mode, the end point is received from a sensor based on first set of rules and the start point is defined by the user.

The presentation module 202 is responsible for all the user interaction through various user interfaces (UIs), for example, a UI to receive a user input for semi-automatic or manual clipping, a UI for manual clipping to receive a user input of clip duration/start time/start frame when the clip duration needs to be different from the duration saved in the configuration file 206, a UI for fine tuning the start point. The presentation module 202 is invoked by the selector module 201 and inputs to a UI may be provided through a remote, a touchscreen, a gesture, a voice input, a compatible mobile device or any compatible input device.

In automatic mode, a UI is shown to user when the clip generation is initiated.

In a manual clipping mode, a thumbnail strip shows the thumbnail of frames pertaining to different time stamps. The thumbnail strip may be required for fine tuning of the start point. For displaying the thumbnail strip, the presentation module 202 communicates with the frame grabber module 204. In one implementation, the exact start point frame is highlighted and is placed in the center of the thumbnail strip. For navigating through the thumbnail strip, input to change the start point may be given through a graphical user interface of arrow keys, a touchscreen, or a gesture control depending on the system 100. A current selected frame is always highlighted in the middle of the thumbnail strip. In that case, the thumbnails are navigated and a new start point is selected, then the frame grabber module 204 is contacted again to get more frames around the new selection point.

In any clipping mode, upon finalization of the start frame, i.e., the start point, the same is communicated from the presentation module 202 to the selector module 201. Finally, the presentation module 202 in any clipping mode informs clip generation status to user.

The buffer module 203 is invoked by a multimedia player or the system 100 whenever the multimedia content is played. The buffer module 203 manages all the buffer related activities. The buffer module 203 may be responsible for performing activities like buffer generation, buffer destruction, buffer flushing, maintaining time stamp of recording content in synchronization with playing content, etc. Based on the user configurations defined in the configuration file 206, the buffer module 203 may generate the buffer which is used to save raw content. When the buffer becomes full, then based on a deletion policy, such as first in first out (FIFO), the buffer is emptied to generate space for more recording. Also, if the user requests a clip duration greater than the time span of recording then a message is flashed to the user indicating maximum allowable clip duration.

The frame grabber module 204 interacts with the buffer module 203 to retrieve frames for the thumbnail strip or raw multimedia for final clip generation. The frame grabber module 204 communicates with the buffer module 203 with the series of time stamps required to extract frames for thumbnail generation. In one implementation, the buffer module 203 may be implemented on a set-top box, a television, an external storage space, or even cloud depending on device's capability. Memory used for the buffer has the pre-requisite that the memory has to be active always.

The frame grabber module 204 is responsible to act as interface between the buffer module 203 and other modules. For fine tuning start point, the frame grabber module 204 generates and provides the thumbnails after retrieving from the buffer module 203 to the presentation module 202. The presentation module 202 invokes the frame grabber module 204 with the start point. The frame grabber module 204 receives all the thumbnail related information from the configuration file 206 like thumbnail size, time difference between thumbnails, and number of thumbnails to be shown. The frame grabber module 204 calculates the series of time stamps for the thumbnail strip using the start point, the time difference between thumbnails, and the number of thumbnails. Few frames are shown around the start point may be used for fine tuning the start frame.

With the series of time stamps for thumbnail strip, the frame grabber module 204 communicates with the buffer module 203 for providing frames at those times. Then, the thumbnails are generated from these frames, which are received from the buffer module 203 and are provided to the presentation module 202 for display.

Upon finalization of the start point, the frame grabber module 204 is contacted by the clipping module 205 for providing raw multimedia between the start and end points for the purpose of clip generation. The frame grabber module 204 in turn contacts the buffer module 203 for providing the raw multimedia, which is then given to the clipping module 205.

The clipping module 205 is invoked by the selector module 201 with the start and end point information to generate the multimedia clip. With the start and end points, the clipping module 205 communicates with the frame grabber module 204 to provide the raw multimedia between the given times and generates the multimedia clip. Finally, the multimedia clip is stored on the storage medium, such as the storage unit 104. The location of the storage medium may be retrieved from the configuration file 206.

The clipping module 205 invokes the storage medium 104 to store the multimedia clip upon taking path from the configuration file 206 and to dump the data. Alternatively, the multimedia clip is stored at a user-specified storage location, which is received from the user in the fly. The storage area may be available on a set-top box, a television, an external storage space, or cloud or direct upload on social site depending on the capability of device on which clipping is being performed.

The configuration file 206 maintains various configurations for clipping process. For example, the configuration file 206 maintains of a predefined duration of the multimedia clip, a predefined start time, a predefined starting frame number, a thumbnail size, a number of thumbnails to be shown, a buffer size, a buffer location, a predefined storage location, and a URL along with credentials for direct upload on a social networking website. However, many more parameters may be stored in the configuration file 206 to increase the configurability of the system. The configuration file 206 may interact with all the modules 201 through 205 as it stores the configurations required by all these modules 201 through 205. The configuration file 206 may be updated with the latest values provided by the user.

In one implementation, the final generated multimedia clip may be stored on any server or may be directly shared on any social networking site as well. All these may be set in the configuration file 206 or may be uploaded at the time of generation through UI instructions of the user.

The external sensor 207 or internal sensor (e.g., 106 in FIG. 1) is used to provide an automatic trigger to the system 100 and hence completely automate the clip generation process without any user intervention. The external sensor 207 or internal sensor 106 may provide the start and end points of the multimedia clip. The external sensor 207 or internal sensor 106 may include any sensors capable of detecting, analyzing, and reporting situations, and hence capable of generating triggers. The sensors may be mood sensors, image processors, and the like. The start and end points are communicated to the selector module 201. In this mode of operation there is no role of the presentation module 202, except showing the UI for conveying clip generation started automatically and the status of clip generation.

At the end of activity marked by the external sensor 207 or the internal sensor, the external sensor 207 or internal sensor provides a trigger to the detection module 200 based on a first set of rules. The first set of predefined rules includes any predefined rule which requires a multimedia clip of a recent content to be generated or that designates an end point of the multimedia clip and starts clipping process. One example of such a rule is, say, a CCTV camera having an image processor may trigger generation of a video clip when any unusual activity by a person is detected in an observed area. In other words, the time of unusual activity may be designated as the end point of the video clip.

At the time of triggering generation of the video clip, the start point is also communicated by the external sensor 207 or the internal sensor based on a second set of rules. In the above example, entry time of the person in the observed area may be designated as the start point from the video clip. The second set of predefined rules includes any predefined rule which designates a start point of the multimedia clip.

Figure 3:
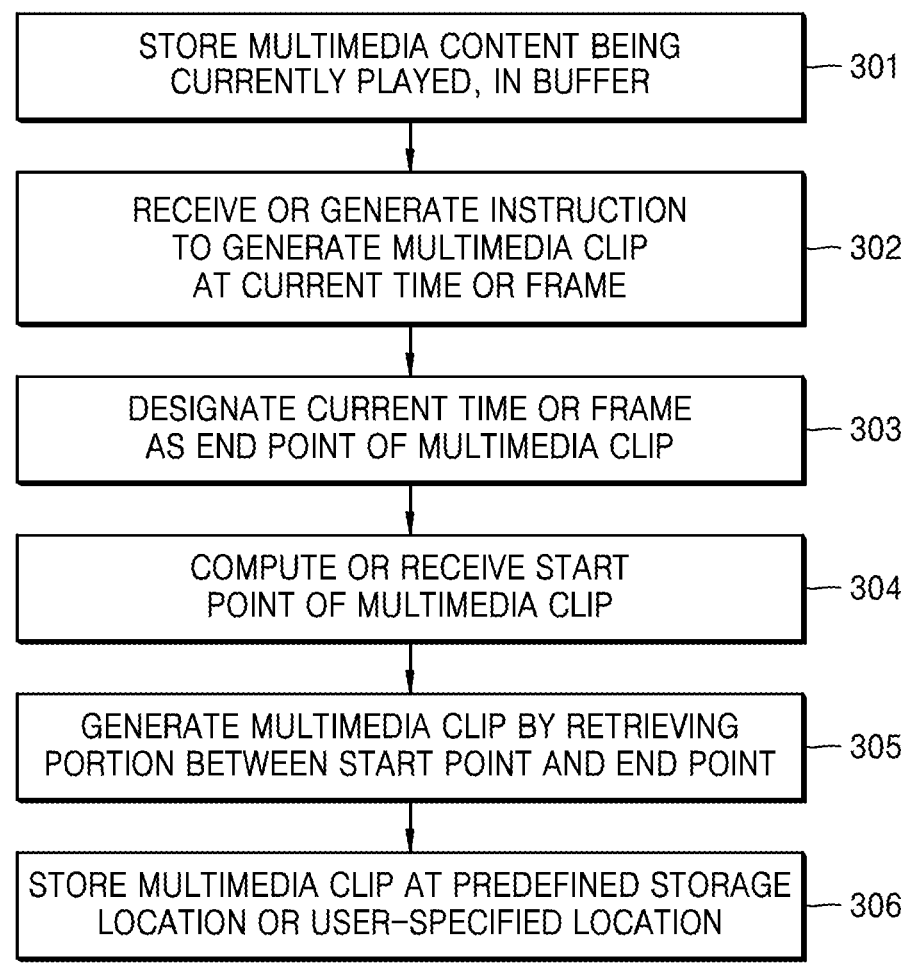
FIG. 3 illustrates a flowchart depicting a multimedia clip generation process according to an embodiment of the present disclosure.

FIG. 3 illustrates a flowchart depicting a multimedia clip generation process according to an embodiment of the present disclosure.

Referring to FIG. 3, in operation 301, multimedia content being currently played is stored in a buffer. In operation 302, an instruction to generate the multimedia clip is received or generated at a current time or a current frame of the multimedia content. The instruction may be provided by an external sensor or an internal sensor in an automatic mode. Alternatively, the instruction may be provided by a user in a semi-automatic mode or a manual mode. In operation 303, the current time or the current frame is designated as an end point of the multimedia clip. In operation 304, a start point of the multimedia clip is either computed or received. In operation 305, the multimedia clip is generated by retrieving from the buffer a stored portion of the multimedia content between the start point and the end point, wherein operations 301 through 305 are performed without interrupting playback of the multimedia content. In operation 306, the multimedia clip is stored at a predefined storage location or a user-specified location provided on the fly.

In an automatic clipping mode, in operation 304, the start point may be received from an external sensor/internal sensor or computed using a duration of the multimedia clip as provided by the external sensor/internal sensor and the end point. In a semi-automatic clipping mode, in operation 304, the start point may be computed using a predefined duration of the multimedia clip mode and the end point. In a manual clipping mode, in operation 304, the start point may be computed using a duration of the multimedia clip as provided by a user and the end point or received as a user input, such as a user interface based input, a text input, a gesture input, or a voice input. The text input may be for a duration, a starting time, or a starting frame number of the multimedia clip.

In one implementation, the method may be implemented for automatically generating a multimedia clip from multimedia content. In the above implementation, the method includes an additional operation (not shown in FIG. 3) of generating, based on the first set of rules, an instruction to generate the multimedia clip. Further, in operation 303, the end point is designated based on receiving the instruction. Further, a duration, a starting time, or a starting frame number of the multimedia clip is computed for computing the start point of the multimedia clip based on the second set of rules.

In one implementation, the method may be implemented for semi-automatically generating a multimedia clip from multimedia content. In the above implementation, in operation 302, the instruction to generate the multimedia content is received from a user interface and the start point is computed in operation 304 from predefined or default duration of the multimedia clip and the end point. Further, this predefined or default duration of the multimedia clip is accessed from a configuration file.

In another implementation, the method may be implemented for semi-automatically generating a multimedia clip from multimedia content. In the above implementation, the method includes an additional operation (not shown in FIG. 3) of generating, based on the first set of rules, an instruction to generate the multimedia clip. Further, in operation 303, the end point is designated based on receiving the instruction. Further, in operation 304, the start point is computed or received based on a user input. This user input could be a duration, a starting time, or a starting frame number of the multimedia clip. Further, the user input may be a user interface based input, a text input, a gesture input, or a voice input.

In one implementation, the method may be implemented for manually generating a multimedia clip from multimedia content with minimal user inputs. In the above implementation, the instruction to generate the multimedia content is provided by a user in operation 302 and the start point is computed or received based on a user input in operation 304. This user input may be a duration, a starting time, or a starting frame number of the multimedia clip. Further, the user input may be a user interface based on input, a text input, a gesture input, a voice input, or a suitable input.

When a user, an external sensor (e.g., 207 in FIG. 2), or an internal sensor (e.g., 106 in FIG. 1) triggers the clipping process, a detection module (e.g., 200 in FIG. 2) is initiated. When the user triggers the clipping process, the detector module invokes a selector module (e.g., 201 in FIG. 2) which in turn invokes a presentation module (e.g., 202 in FIG. 2) and the user is requested to choose mode of clipping from amongst a semi-automatic mode and a manual mode. Accordingly, the clipping modes are categorized into 3 categories: (1) an automatic clipping mode, where no input is required from the user for the clip generation process, inputs are received from the external sensor, internal sensor, or a configuration file (e.g., 206 in FIG. 2); (2) a semi-automatic clipping mode wherein a single user input is required; and (3) a manual clipping mode. The manual clipping mode may be further categorized in five modes: (a) single input change—clip duration/start time/start frame; (b) start point change through a time input; (c) start point change through a frame number input; (d) start point change through a hand gesture; and (e) start point change through a voice input. The operation in each of above listed modes is described below in detail.

In the automatic clipping mode, the entire clipping process may be completely automated without requiring any input from the user. This may be done in three different ways based on information set by a user in the configuration file, the first set of rules to designate the end point, and the second set of rules to designate the start point/clip duration. In any of the three automatic modes, a status notification may be shown to the user once the clipping operation is initiated and completed.

In the automatic clipping mode using only the first set of rules and the duration set in the configuration file, the external sensor, or the internal sensor triggers the automatic clipping process without requiring any input from the user. The end point is designated based on the first set of rules, while the start point is automatically received from configuration file, where the user has pre-set the duration of the clip. Further, the multimedia clip is stored at a predefined location as per settings configured in the configuration file.

Figure 4:
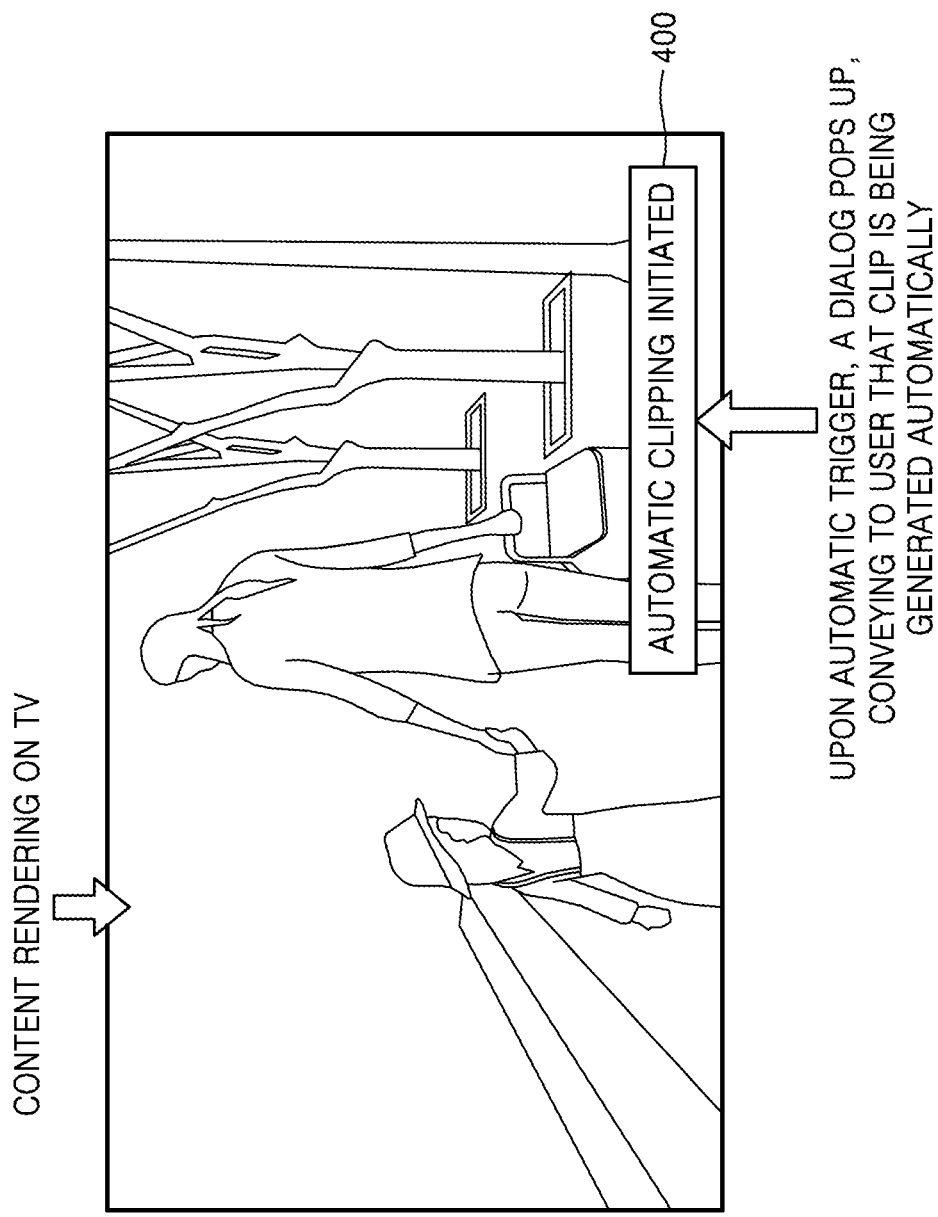
FIG. 4 illustrates a user interface for automatic clipping according to an embodiment of the present disclosure.

FIG. 4 illustrates a user interface for automatic clipping according to an embodiment of the present disclosure.

Referring to FIG. 4, the user may be informed through a UI 400 that automatic clipping has started. Once the clipping operation is completed, a status of the multimedia clip may be shown to the user.

Figure 5:
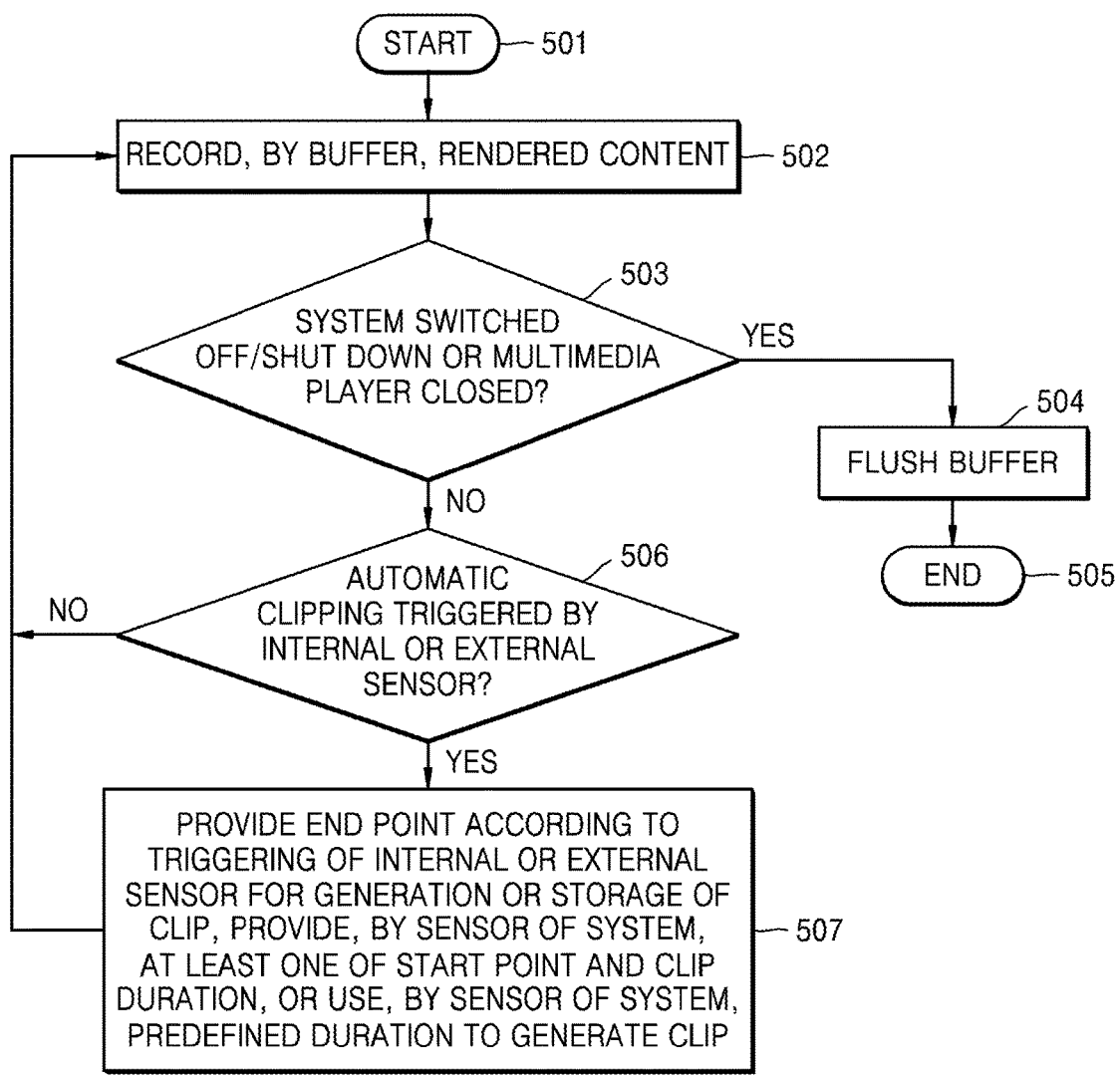
FIG. 5 illustrates a flowchart depicting an automatic clipping mode according to an embodiment of the present disclosure.

FIG. 5 illustrates a flowchart depicting an automatic clipping mode according to an embodiment of the present disclosure.

Referring to FIG. 5 after the start in operation 501, the buffer starts, based on instructions from the multimedia player or a system, recording a currently playing portion of the multimedia content as per its capacity, in operation 502. It is to be noted here that the buffer is deactivated when the multimedia content is not played. Anytime during operation if the system is switched off/shut down or the multimedia player is closed in operation 503, then the buffer is flushed in operation 504 and clipping process is terminated in operation 505. In operation 506, automatic clipping is triggered by an external sensor (e.g., 207 in FIG. 2) or an internal sensor (e.g., 106 in FIG. 1) based on the first set of rules. In operation 507, that a particular time or frame is designated as the end point of the multimedia clip and the start point of the clip is received from a configuration file (e.g., 206 in FIG. 2) where the user has already set the duration of the resulting multimedia clip. Otherwise, the buffer keeps on recording currently playing content and deleting old content based on a deletion policy, such as FIFO. Based on the start point and the end point, the stored portion of the multimedia content that is within the start point and the end point is retrieved to automatically generate the multimedia clip. The multimedia clip is stored at a predefined location as specified in the configuration file. In this way, no input is received from the user and the multimedia clip is generated without interrupting the playback of the multimedia content.

In an automatic clipping mode using only the second set of rules and the duration set in the configuration file, the external sensor or the internal sensor triggers the clipping process without requiring any input from the user. The start point is decided based on the second set of rules. The end point is automatically received from the configuration file where the user has pre-set the duration of the clip. The multimedia clip is stored at a predefined location as per settings configured in the configuration file.

The user may be informed through a user interface that automatic clipping has been initiated. Such a user interface is shown in FIG. 4. Once the clipping operation is completed, the status of the multimedia clip may be shown to the user. FIG. 5 illustrates a flowchart depicting the automatic clipping mode. After the start in operation 501, then only the buffer starts, based on instructions from the multimedia player or the system, recording a currently playing portion of the multimedia content as per its capacity, in operation 502. It is to be noted here that the buffer is deactivated when the multimedia content is not played. Anytime during operation if the system is switched off/shut down or the multimedia player is closed in operation 503, then the buffer is flushed in operation 504 and clipping process is terminated in operation 505. In operation 506, automatic clipping is triggered by the external sensor or the internal sensor based on the second set of rules then, in operation 507, that a particular time or frame is designated as the start point of the multimedia clip and the end point of the clip is received from the configuration file where user has already set the duration of the resulting clip. Otherwise, the buffer keeps on recording currently playing content and deleting old content based on a deletion policy, such as FIFO. Based on the start point and the end point, the stored portion of the multimedia content that is within the start point and the end point is retrieved to generate the multimedia clip. The multimedia clip is stored at a predefined location as specified in the configuration file. In this way, no input is received from the user and the multimedia clip is generated without interrupting the playback of the multimedia content.

In automatic clipping mode using the first set of rules and the second set of rules, the external sensor or the internal sensor triggers the clipping process without requiring any input from the user. The start point and end point is decided based on second set of rules and first set of rules respectively. The multimedia clip is stored at a predefined location as per settings configured in the configuration file.

The user may be informed through a user interface that automatic clipping has started. Such a user interface is shown in FIG. 4. Once the clipping operation is completed, then status of the multimedia clip may be shown to the user. FIG. 5 illustrates a flowchart depicting an automatic clipping mode. After the start in operation 501, the buffer starts, based on instructions from the multimedia player or the system, recording a currently playing portion of the multimedia content as per its capacity, in operation 502. It is to be noted here that the buffer is deactivated when the multimedia content is not played. Anytime during operation if the system is switched off/shut down or the multimedia player is closed in operation 503, then the buffer is flushed in operation 504 and clipping process is terminated in operation 505. In operation 506, if automatic clipping is triggered by the external sensor or the internal sensor based on the first set of rules then, in operation 507, that particular time or frame is designated as the end point of the multimedia clip and the start point of the clip is automatically computed based on the second set of rules. Otherwise, the buffer keeps on recording currently playing content and deleting old content based on a deletion policy, such as FIFO. Based on the start point and the end point, the stored portion of the multimedia content that is within the start point and the end point is retrieved to generate the multimedia clip. The multimedia clip is stored at a predefined location as specified in the configuration file. In this way, no input is received from the user and the multimedia clip is generated without interrupting the playback of the multimedia content.

In any of the above described automatic modes, the automatically generated multimedia clip may be stored at a user-specified location provided on the fly in place of a predefined location specified in the configuration file.

In a semi-automatic clipping mode, the user triggers the clipping process. Then, a detector module (e.g., 200 in FIG. 2) responds to the trigger and invokes a selector module (e.g., 201 in FIG. 2) which hence invokes a presentation module (202 in FIG. 2) which presents clipping mode selection options, such as a semi-automatic clipping mode option and a manual clipping mode option.

Figure 6:
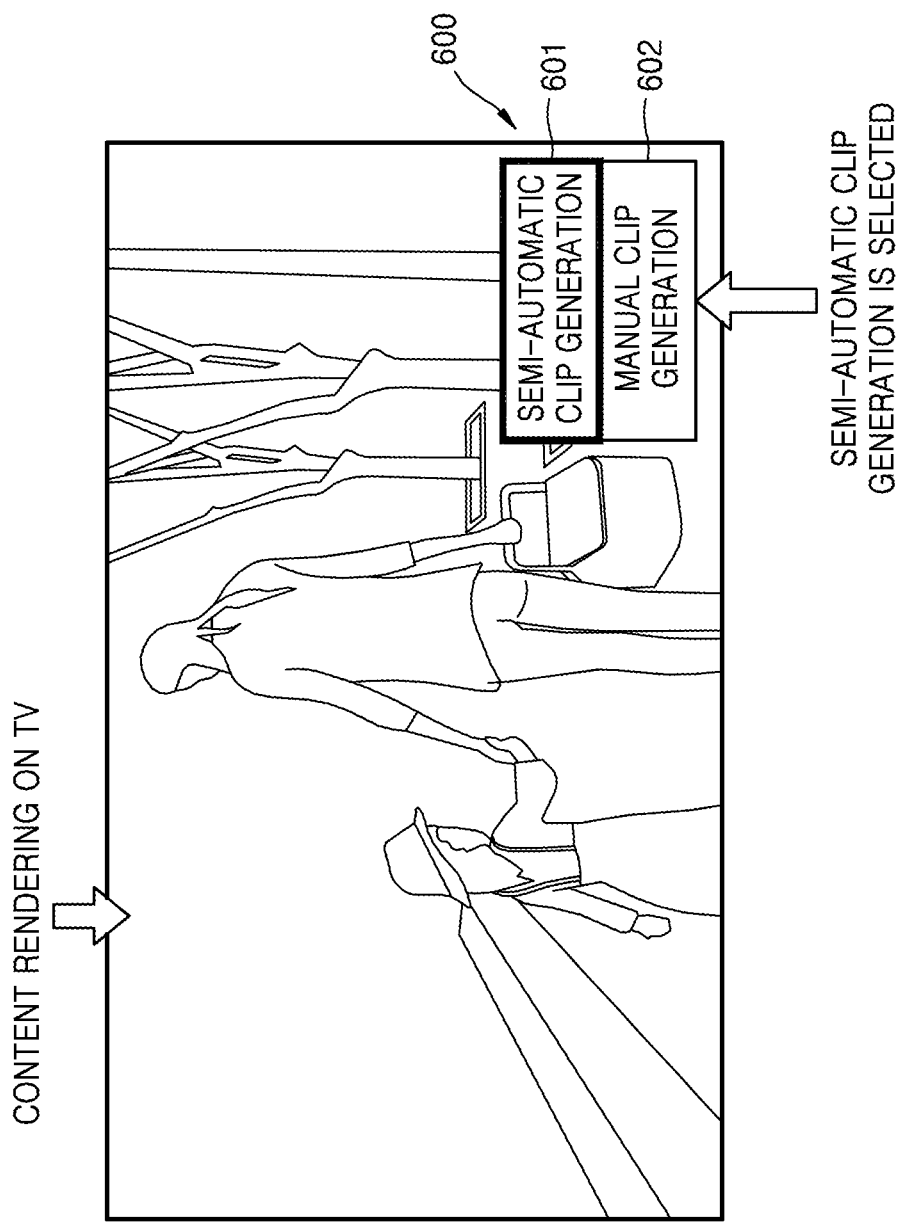
FIG. 6 illustrates a user interface for a semi-automatic clipping request according to an embodiment of the present disclosure.

FIG. 6 illustrates a user interface for a semi-automatic clipping request according to an embodiment of the present disclosure.

Referring to FIG. 6, if the user chooses a semi-automatic clipping mode option 601 from clipping mode selection options 600, that is the only time the user needs to interact once and then the multimedia clip is automatically generated and saved at a predefined location or additionally, a user-specified location provided on the fly. In semi-automatic clipping mode 601, other relevant information is extracted from a configuration file (e.g., 206 clipping mode selection options. After receiving a user input through a presentation module (e.g., 202 in FIG. 2), a selector module (e.g., 201 in FIG. 2) contacts the configuration file and extracts the clip duration. Further, the selector module computes the start point and a clipping module (e.g., 205 in FIG. 2) is invoked with the start and end points for clip generation. The clipping module extracts the predefined storage location from the configuration file and dumps the multimedia clip at the predefined storage location. Alternatively, the multimedia clip is stored at a user-specified storage location, which is received from the user in the fly. Status notification is shown to the user once the semi-automatic clipping operation is completed.

In the semi-automatic implementation, the user trigger provides the end point and a predefined duration stored in the configuration file is used to compute the start point. In another semi-automatic implementation, a sensor may provide the end point based on the first set of rules, while a user trigger provides the start point. In another semi-automatic implementation, the user trigger may provide the end point, while a sensor trigger provides the start point based on the second set of rules.

Figure 7:
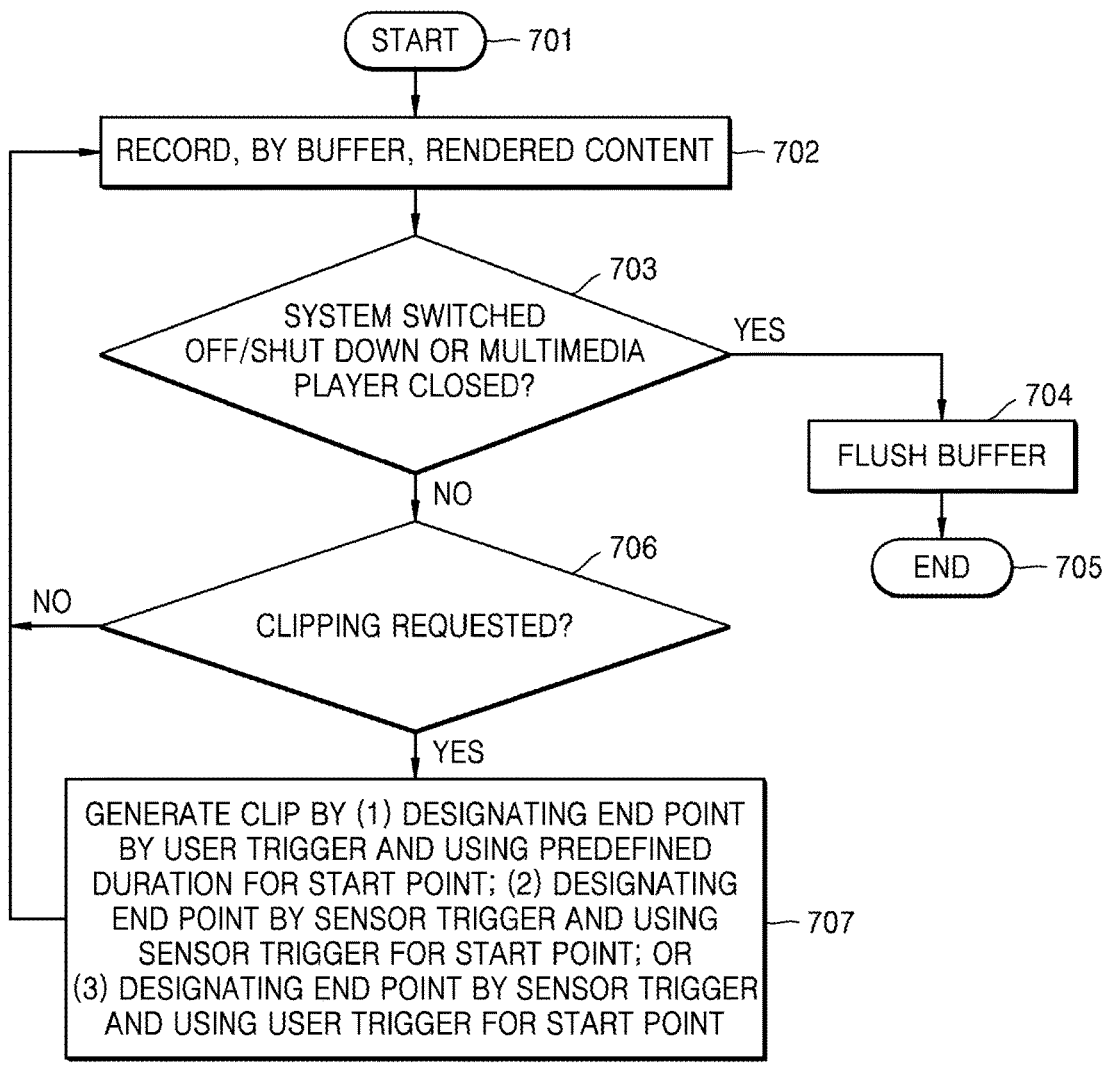
FIG. 7 illustrates a flowchart depicting a semi-automatic clipping mode according to an embodiment of the present disclosure.

FIG. 7 illustrates a flowchart depicting a semi-automatic clipping mode according to an embodiment of the present disclosure.

Referring to FIG. 7 after start in operation 701, the buffer starts recording in operation 702, based on instructions from the multimedia player or the system, a currently playing portion of the multimedia content as per the capacity of the buffer. It is to be noted here that the buffer is deactivated when the multimedia content is not played. Anytime during operation if the system is switched off/shut down or the multimedia player is closed in operation 703, then the buffer is flushed in operation 704 and clipping process is terminated in operation 705. In operation 706 a trigger for semi-automatic clipping is received. In operation 707, clip is generated in one of the following three ways: (1) a user trigger designates the end point, while a predefined duration fetched from a configuration file (e.g., 206 in FIG. 2) is used to compute the start point; (2) a sensor trigger designates the end point based on the first set of rules, while a user trigger/input is required for designating the start point; or (3) a user trigger designates the end point, while a sensor trigger designates the start point based on the second set of rules. Otherwise, the buffer keeps on recording currently playing content and deleting old content based on a deletion policy, such as FIFO. Based on the start point and the end point, the stored portion of the multimedia content that is within the start point and the end point is retrieved to generate the multimedia clip. The multimedia clip is stored at a predefined location as specified in the configuration file or at a user-specified location provided on the fly. In this way, only one input is received from the user that is just to start the clipping process and the multimedia clip is generated without interrupting the playback of the multimedia content and without requiring any further inputs from the user.

In manual clipping modes, the user may request for interactive clip generation. This may be done in five different ways based on the input provided by the user. If the user wants to fine tune the start point, then the below mentioned single input mode may be selected by the user, otherwise anyone of the other manual modes may be selected. In any of the manual modes, the status notification is shown to the user once the clipping operation is completed.

Figure 8:
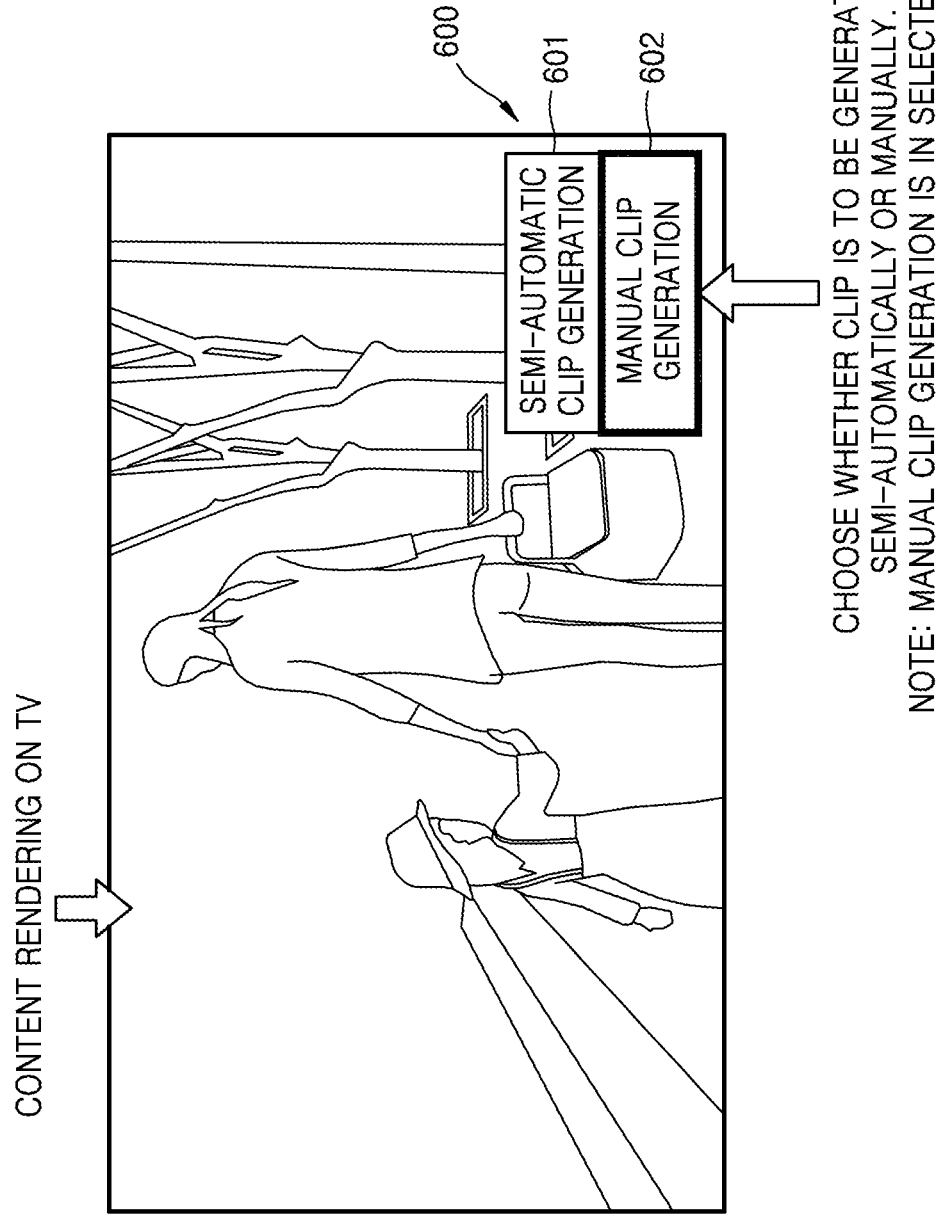
FIG. 8 illustrates a user interface for a manual clipping request according to an embodiment of the present disclosure.

FIG. 8 illustrates a user interface for a manual clipping request according to an embodiment of the present disclosure.

Referring to FIG. 8, in a manual mode with a single input of clip duration, or a start time, or a frame number change, the user triggers clip generation. Then, a detector module (e.g., 200 in FIG. 2) responds to the trigger and invokes a selector modules (e.g., 201 in FIG. 2) which in turn invokes a presentation module (e.g., 202 in FIG. 2) which presents clipping mode selection options 600, such as the semi-automatic clipping mode option 601 and the manual clipping mode option 602. If the user chooses the manual clipping mode option 602 as shown in FIG. 8, then the selector module re-invokes the presentation module to give choices on the manual clipping modes.

Figure 9:
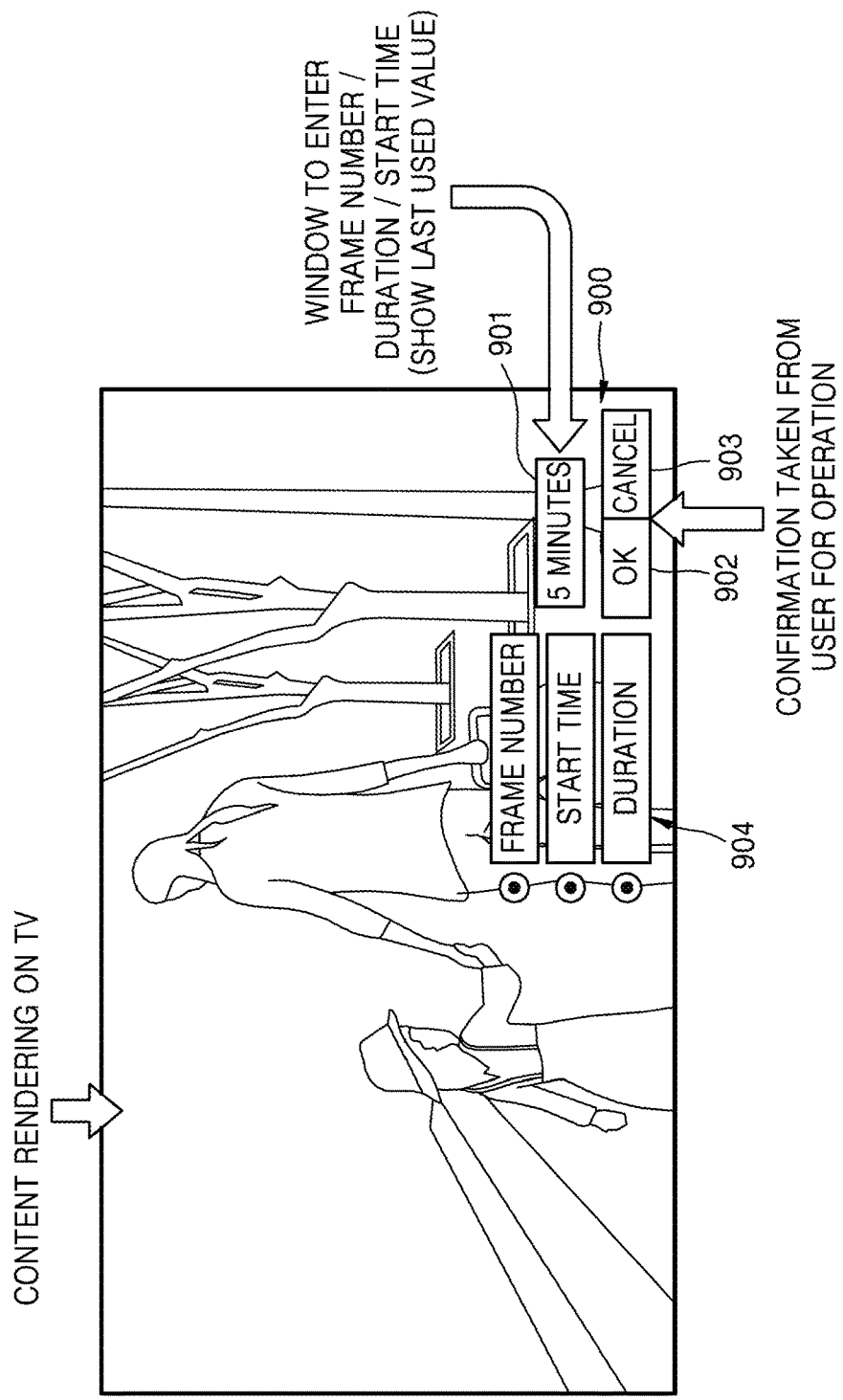
FIG. 9 illustrates a user interface for manual clipping with a single input of clip duration or a frame number or a start time according to an embodiment of the present disclosure.

FIG. 9 illustrates a user interface for manual clipping with a single input of clip duration or a frame number or a start time according to an embodiment of the present disclosure.

Referring to FIG. 9, if the user chooses duration/start time/frame number change mode, then a user interface 900 is displayed to enter a single input for duration/start time/frame number.

In one implementation, the user interface 900 may include a text box 901 to receive the duration/start time/frame number, an OK button 902 to confirm the duration/start time/frame number, a cancel button 903 to cancel the operation, and radio buttons 904 to select between duration, start time, frame number input options. In operation, the duration/start time/frame number is communicated to a selector module (e.g., 201 in FIG. 2) and the start point is calculated based on the received duration/start time/frame number. After that, a clipping module (e.g., 205 in FIG. 2) is invoked with the start and end points for clip generation. The clipping module extracts the predefined storage location from a configuration file (e.g., 206 in FIG. 2) and dumps the multimedia clip at the predefined storage location. Alternatively, the multimedia clip is stored at a user-specified storage location, which is received from the user in the fly.

Figure 10:
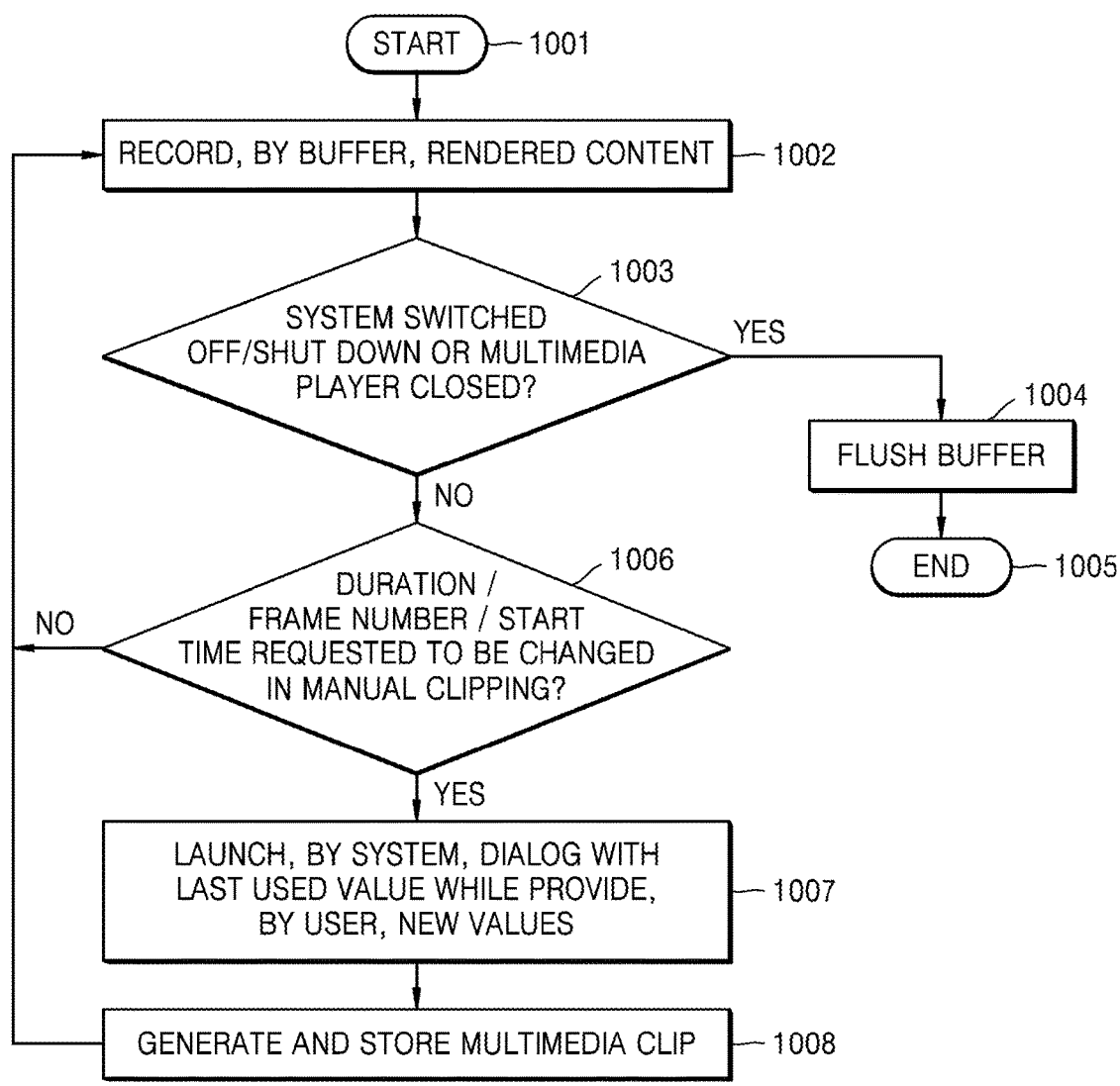
FIG. 10 illustrates a flowchart depicting manual clipping with a single input of clip duration or a frame number or a start time according to an embodiment of the present disclosure.

FIG. 10 illustrates a flowchart depicting manual clipping mode with only duration/start time/frame number change according to an embodiment of the present disclosure.

Referring to FIG. 10, after start in operation 1001, in operation 1002 the buffer starts recording, based on instructions from the multimedia player or the system, a currently playing portion of the multimedia content as per its capacity. It is to be noted here that the buffer is deactivated when the multimedia content is not played. Anytime during operation if the system is switched off/shut down or the multimedia player is closed in operation 1003, then the buffer is flushed in operation 1004 and the clipping process is terminated in operation 1005. When clipping with duration/start time/frame number change only is triggered by the user in operation 1006 that a particular time or frame is designated as the end point of the multimedia clip. Otherwise, the buffer keeps on recording currently playing content and deleting old content based on a deletion policy, such as FIFO. In operation 1007, the start point of the multimedia clip is computed based on new values for duration/start time/frame number for the multimedia clip as provided by the user in a dialog launched by the system with a last used value. Based on the start point and the end point, the stored portion of the multimedia content that is within the start point and the end point is retrieved to generate the multimedia clip, in operation 1008. The multimedia clip is stored at a predefined location as specified in a configuration file (e.g., 206 in FIG. 2) or at a user-specified location provided on the fly. In this way, only two inputs are received from the user; one is just to start the clipping process and another is to provide the duration/start frame/start time for the multimedia clip. Further, the multimedia clip is generated without interrupting the playback of the multimedia content and without requiring any other inputs from the user.

Figure 11:
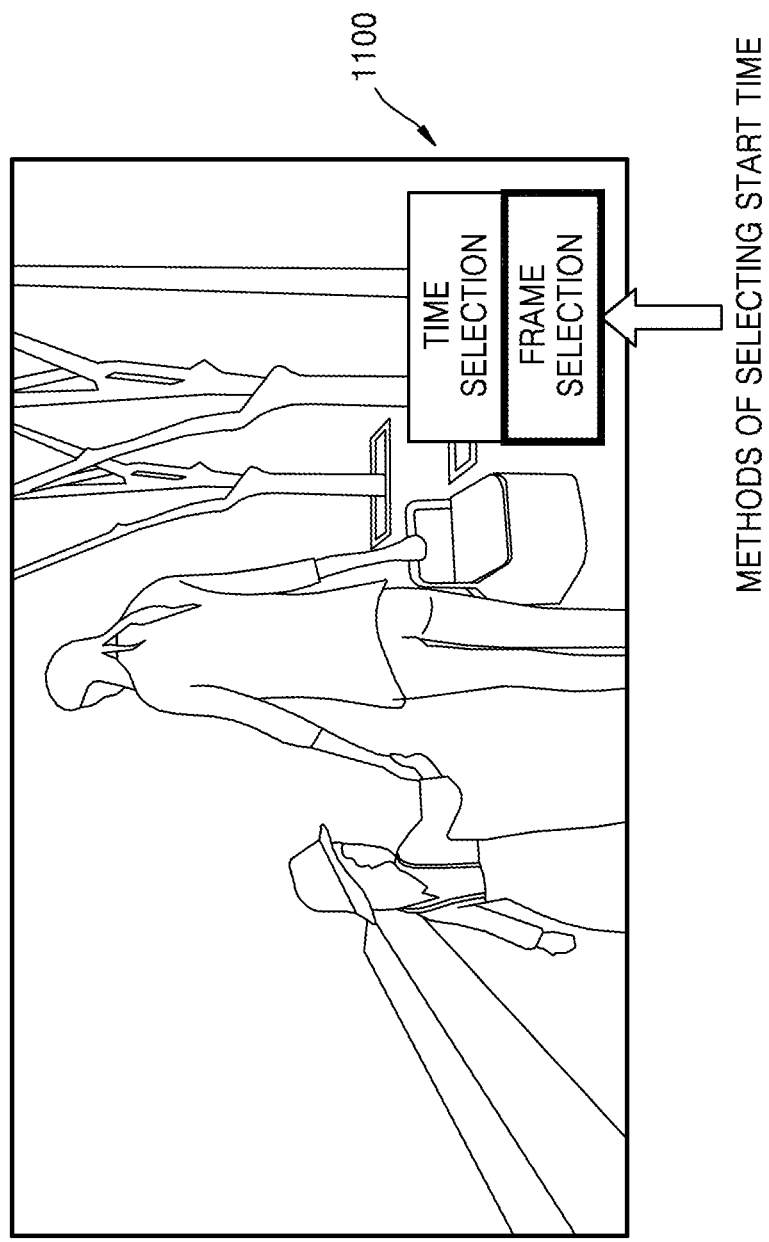
FIG. 11 illustrates a user interface for selecting a method of fine tuning a start point of clipping according to an embodiment of the present disclosure.

FIG. 11 illustrates a user interface for selecting a method of fine tuning the start point of clipping according to an embodiment of the present disclosure.

In a manual mode with start point change through a time input, the user triggers clip generation. Then, a detector module (e.g., 200 in FIG. 2) responds to the trigger and invokes a selector module (e.g., 201 in FIG. 2) which in turn invokes a presentation module (e.g., 202 in FIG. 2) which presents clipping mode selection options, such as the semi-automatic clipping mode and the manual clipping mode. If the user chooses the manual clipping mode, then the selector module re-invokes the presentation module to give choices of an item 1100 on selecting one of the manual clipping modes as shown in FIG. 11.

Figure 12:
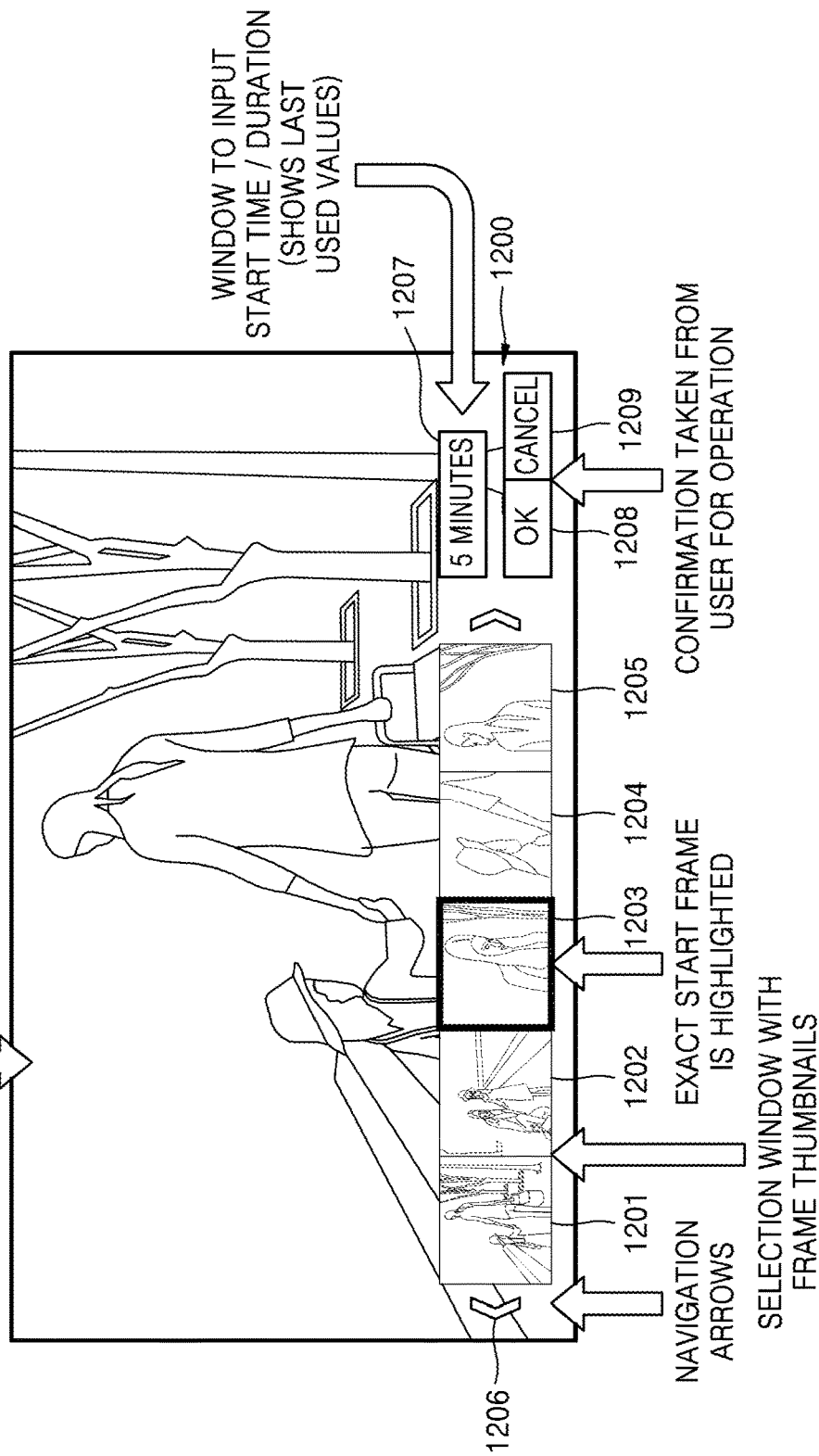
FIG. 12 illustrates a user interface for manual clipping in a textual time or a duration input mode according to an embodiment of the present disclosure.

FIG. 12 illustrates a graphical user interface 1200 for the manual mode with start point change through a textual time/duration input according to an embodiment of the present disclosure.

Referring to FIG. 12, if the user chooses the manual mode with start point change through textual time/duration input, then a presentation module (e.g., 202 in FIG. 2) communicates with a frame grabber module (e.g., 204 in FIG. 2) to provide frame thumbnails, with a current start point highlighted in middle. The frame grabber module accesses a configuration file (e.g., 206 in FIG. 2) and receives thumbnail related information, such as information of thumbnail size, time difference between thumbnails, and number of thumbnails to be shown. The frame grabber module, based on the start point and the configuration file information, generates a time strip for which frame thumbnails are required. Based on time on the time strip, the frame grabber module communicates with a buffer module (e.g., 203 in FIG. 2) and requests for the frames for those time stamps. The buffer module provides those frames to the frame grabber module which are then converted into thumbnails. These thumbnails are given to a presentation module (e.g., 202 in FIG. 2) for displaying to the user for selection of the desired start point.

In the graphical user interface 1200, thumbnails 1201, 1202, 1203, 1204 and 1205 are displayed in such a way that a start point frame 1203 is in the center of the thumbnail strip and is highlighted and navigational arrows 1206 on both the sides of the thumbnail strip are shown. Along with the navigational arrows 1206, one input text box 1207, which receives a time input and conformational and cancelation buttons 1208 and 1209 are also displayed. The user is free to provide an input either by entering the duration/start time as a text input or select the start frame by navigating the thumbnail strip and give a selection input using the graphical user interface 1200 of the thumbnail strip.

Based on a user input, time of the selected frame is communicated to the frame grabber module for generating a fresh time strip and thumbnails. The above processes are repeated until the start point is not freezed or the clipping operation is cancelled by the user.

Upon freezing the start point, the start time or clip duration is communicated by the presentation module to the selector module. The selector module manipulates the input to generate the start point and invokes a clipping module (e.g., 205 in FIG. 2) with the start and end points for clip generation. The clipping module extracts the predefined storage location from the configuration file and dumps the multimedia clip at the predefined storage location. Alternatively, the multimedia clip is stored at a user-specified storage location, which is received from the user in the fly. If the user cancels the clipping operation, then the configuration file retains the previous values.

In a manual mode with start point change through thumbnail number selection, the user triggers clip generation. Then, a detector module (e.g., 200 in FIG. 2) responds to the trigger and invokes the selector module which in turn invokes the presentation module which presents clipping mode selection options, such as the semi-automatic clipping mode and the manual clipping mode. If the user chooses the manual clipping mode, then the selector module re-invokes the presentation module to give choices on the manual clipping modes. If the user chooses the manual mode with start point change through frame number or thumbnail number selection as shown in FIG. 13, then the presentation module communicates with the frame grabber module to provide thumbnails 1201 through 1205, with a start point 3.

Figure 13:
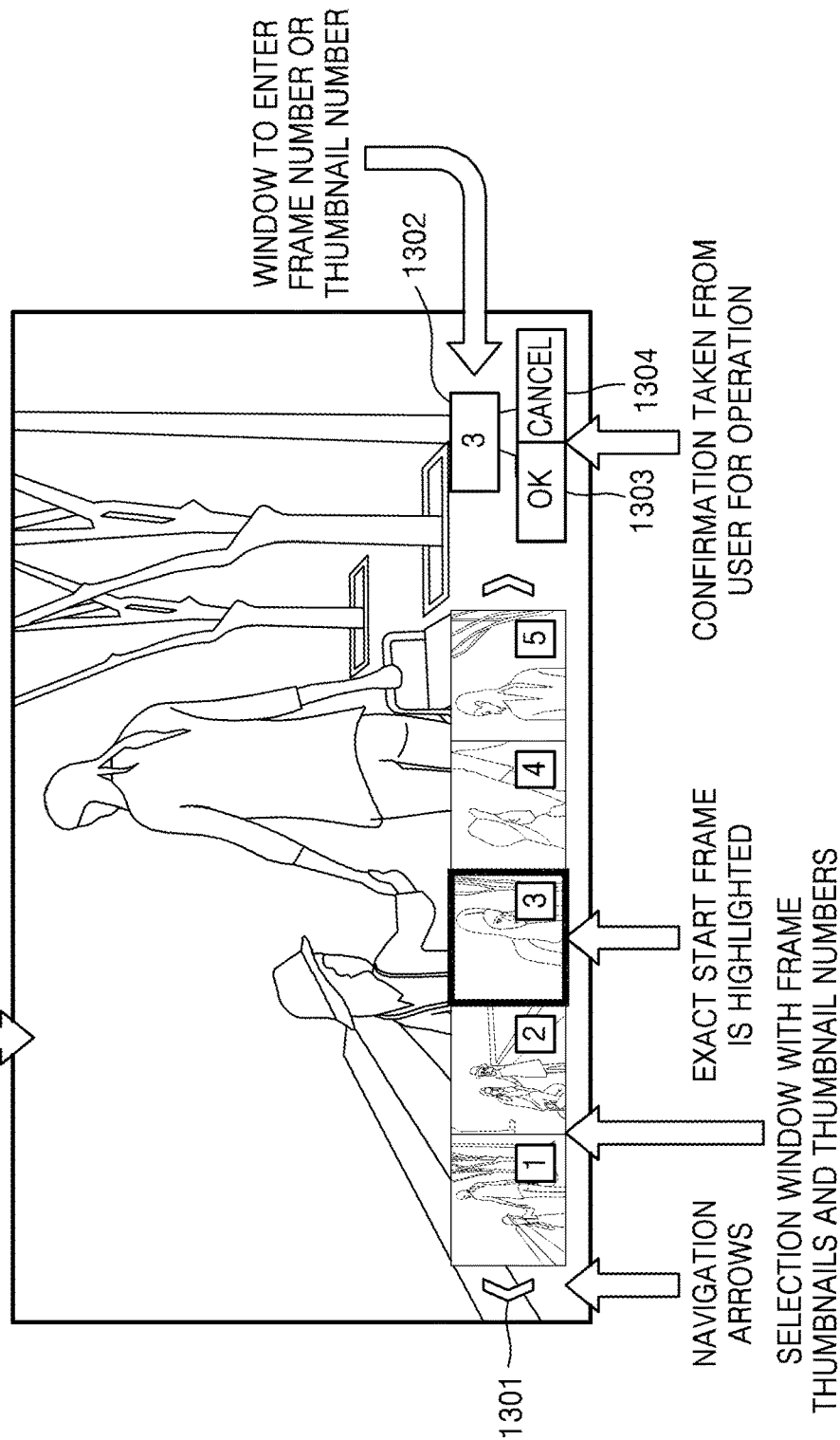
FIG. 13 illustrates a user interface for manual clipping in a textual thumbnail/frame number input mode according to an embodiment of the present disclosure.

FIG. 13 illustrates a user interface for manual clipping in a textual thumbnail/frame number input mode according to an embodiment of the present disclosure.

Referring to FIG. 13, a frame grabber module (e.g., 204 in FIG. 2) contacts a configuration file (e.g., 206 in FIG. 2) and extracts thumbnail related information, such as information of thumbnail size, time difference between frame thumbnails, and number of thumbnails to be shown. The frame grabber module based on the start point and the extracted information generates a time strip for which frame thumbnails are required. Based on time on the time strip, the frame grabber module communicates with a buffer module (e.g., 203 in FIG. 2) and requests for the frames for those time stamps. The buffer module provides those frames to the frame grabber module which is then converted into thumbnails. These thumbnails are given to a presentation module (e.g., 202 in FIG. 2) for displaying to the user for selection of the exact start point. The presentation module adds the thumbnail numbers 1 through 5 as thumbnails. The thumbnails are displayed in such a way that the start point frame 3 is in the center of the thumbnail strip and is highlighted and navigational arrows 1301 on both the sides of the strip are shown. Along with the navigational arrows 1301, one input box 1302 is shown that receives a thumbnail number as text input and conformational and cancellation buttons 1303 and 1304 are also displayed. The user is free to provide an input either by entering the thumbnail number given on thumbnails or select the start frame through a graphical user interface based on input through the navigational arrows 1301 while navigating the thumbnail strip. The user navigates or provides a text input then based on a user input, time of the selected frame is communicated to the frame grabber module for generating a fresh time strip and thumbnails. The above processes are repeated until the start point is not freezed or the clipping operation is cancelled by the user.

In one example, the user may not provide the desired thumbnail numbered directly, but provide a random thumbnail number to go to a desired portion of recently played multimedia content. Once a thumbnail strip around the random thumbnail number is displayed with the random thumbnail highlighted in the middle, the user may then select the desired thumbnail either through a graphical user interface (GUI) based on a selection input or a text input specifying the thumbnail number of the desired thumbnail. However, if the random thumbnail number does not lead to the desired thumbnail, the user may also chose to further navigate through the thumbnail strip using graphical arrows or enter another random number based on their instinct in order to locate the desired thumbnail.

Upon freezing the start point, the same is communicated by the presentation module to a selector module (e.g., 201 in FIG. 2). The selector module invokes a clipping module (e.g., 205 in FIG. 2) with the start and end points for clip generation. The clipping module extracts the predefined storage location from the configuration file and dumps the multimedia clip at the predefined storage location. Alternatively, the multimedia clip is stored at a user-specified storage location, which is received from the user in the fly. If the user cancels the clipping operation, then the configuration file retains the previous values.

Figure 14:
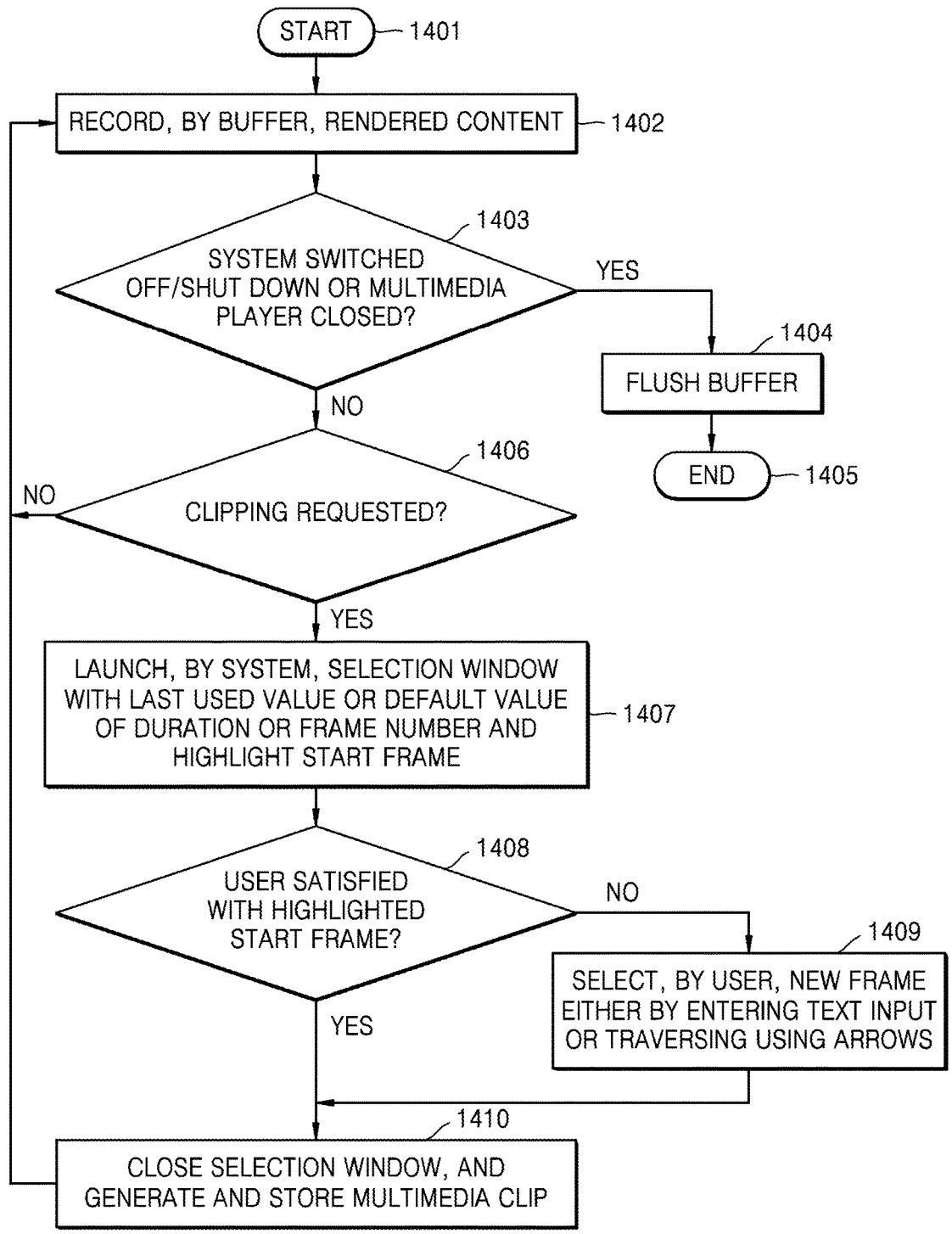
FIG. 14 illustrates a flowchart depicting manual clipping in a textual input mode according to an embodiment of the present disclosure.

FIG. 14 illustrates a flowchart depicting a manual clipping mode with a textual time or frame input according to an embodiment of the present disclosure.

Referring to FIG. 14, after start in operation 1401, in operation 1402, the buffer starts recording, based on instructions of the system or the multimedia player, a currently playing portion of the multimedia content as per its capacity. It is to be noted here that the buffer is deactivated when the multimedia content is not played. Anytime during operation if the system is switched off/shut down or the multimedia player is closed in operation 1403, then the buffer is flushed in operation 1404 and the clipping process is terminated in operation 1405. When clipping is triggered by the user in operation 1406 that a particular time or frame is designated as the end point of the multimedia clip. In operation 1407, a selection window with a last used value or default value is launched to receive the start point of the multimedia clip from the user in form of a starting time, a duration, or a starting frame number as explained above in conjunction with FIGS. 12 and 13. Till the time the user is not satisfied with the starting point in operation 1408, the user may select the start point by entering a text input for time or a frame number, otherwise by traversing through GUI arrows and selecting the start point in operation 1409. Once the user is satisfied in operation 1408, the selection window is closed in operation 1410. At the same time, the stored portion of the multimedia content that is within the start point and the end point is retrieved to generate the multimedia clip and the multimedia clip is stored at a predefined location as specified in a configuration file (e.g., 206 in FIG. 2) or at a user-specified location provided on the fly. In this way, only three inputs are received from the user; first is just to start the clipping process, second is to select a desired manual mode, and third is to provide the start point for the multimedia clip. Further, the multimedia clip is generated without interrupting the playback of the multimedia content and without requiring any other inputs from the user.

In a manual mode with start point change through a gesture, the user triggers clip generation. Then, a detector module (e.g., 200 in FIG. 2) responds to the trigger and invokes a selector module (e.g., 201 in FIG. 2) which in turn invokes a presentation module (e.g., 202 in FIG. 2) which presents clipping mode selection options, such as the semi-automatic clipping mode and the manual clipping mode. If the user chooses the manual clipping mode, then the selector module re-invokes the presentation module to give choices on the manual clipping modes on a device which may receive multiple types of input. In one example, the user may choose the manual mode with start point change through a gesture input. A user interface for the choices is not required on a device which inherently receives gestures inputs. Then, the presentation module communicates with a frame grabber module (e.g., 204 in FIG. 2) to provide frame thumbnails with a start point. The frame grabber module accesses a configuration file (e.g., 206 in FIG. 2) and receives thumbnail related information, such as information of thumbnail size, time difference between thumbnails, and number of thumbnails to be shown. The frame grabber module based on the start point and the configuration file information generates time strip for which frame thumbnails are required. Based on time on the time strip, the frame grabber module communicates with a buffer module (e.g., 203 in FIG. 2) and requests for the frames for those time stamps. The buffer module provides those frames to the frame grabber module which are then converted into thumbnails. These thumbnails are given to the presentation module for displaying to the user for selection of the desired start point.

Figure 15:
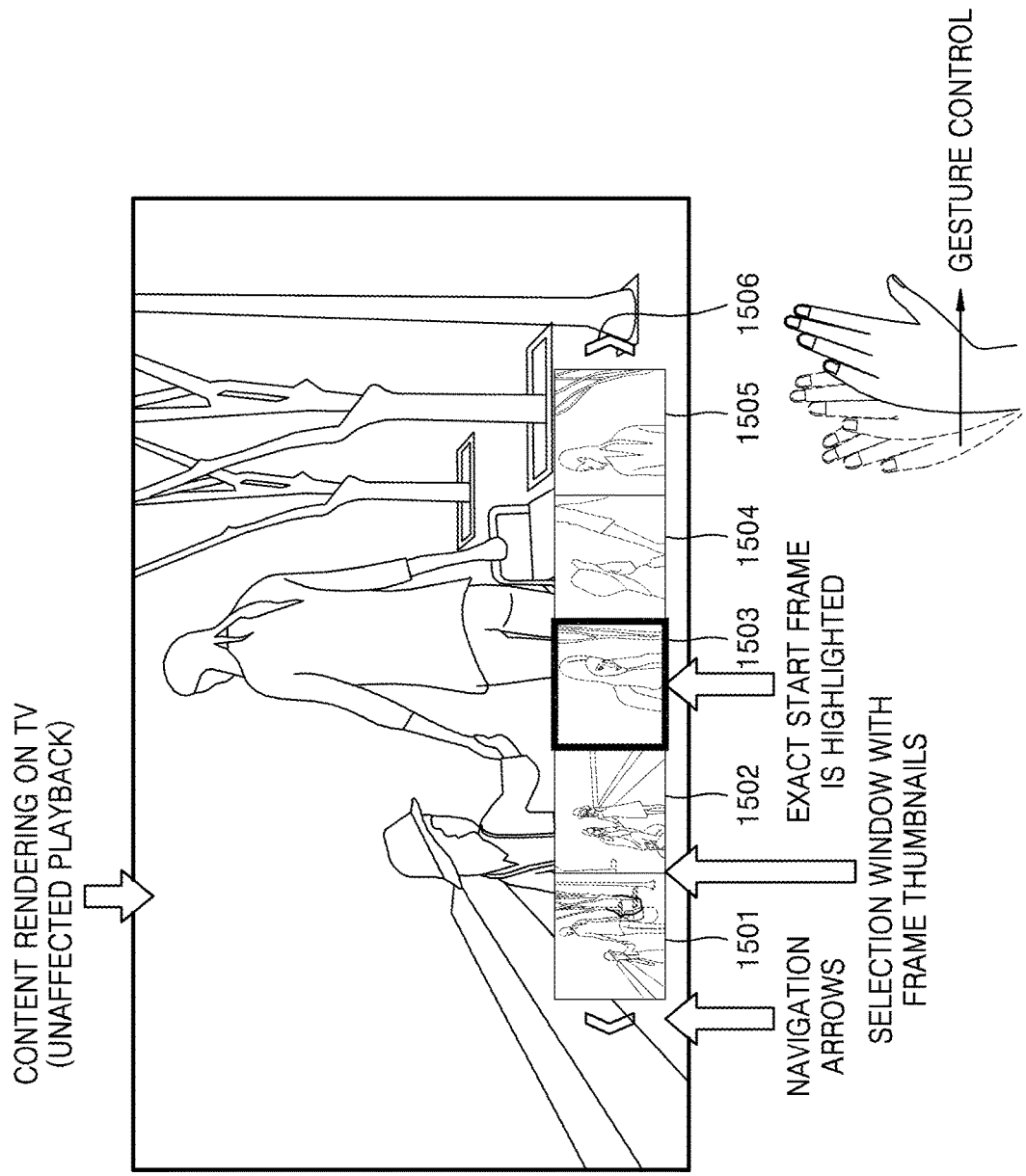
FIG. 15 illustrates a user interface for manual clipping in a gesture input mode according to an embodiment of the present disclosure.

FIG. 15 illustrates a GUI for a manual mode with start point change through a gesture according to an embodiment of the present disclosure.

Referring to FIG. 15, thumbnails are displayed in such a way that a current start point frame 1503 is in the center of a strip of thumbnails 1501, 1502, 1503, 1504 and 1505 and is highlighted and navigational arrows 1506 on both the sides of the strip are shown. The user may provide an input through a gesture to select the start frame by navigating the thumbnail strip. The time of the selected frame is communicated to a frame grabber module (e.g., 204 in FIG. 2) for generating a fresh time strip and thumbnails. The above processes are repeated until the start point is not freezed or the clipping operation is cancelled by the user.

Upon freezing the start point, the start point is communicated by a presentation module (e.g., 202 in FIG. 2) to a selector module (e.g., 201 in FIG. 2). The selector module manipulates the input (if required) to generate the start point and invokes a clipping module (e.g., 205 in FIG. 2) with the start and end points for clip generation. The clipping module extracts the predefined storage location from a configuration file (e.g., 206 in FIG. 2) and dumps the multimedia clip at the predefined storage location. Alternatively, the multimedia clip is stored at a user-specified storage location, which is received from the user in the fly. If the user cancels the clipping operation, then the configuration file retains the previous values.

Figure 16:
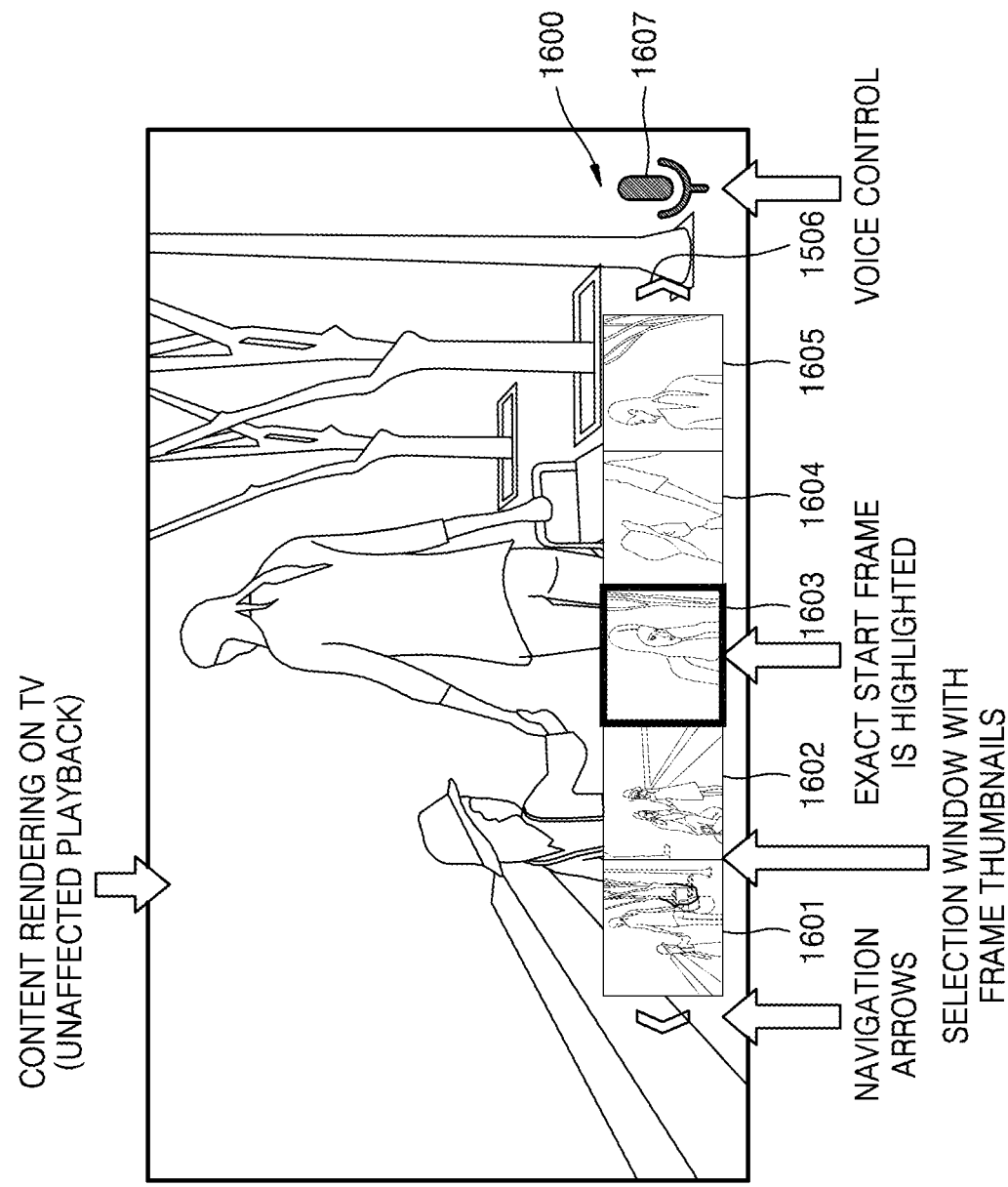
FIG. 16 illustrates a user interface for manual clipping in a voice input mode according to an embodiment of the present disclosure.

In a manual mode with start point change through a voice input, the user triggers clip generation. Then, a detector module (e.g., 200 in FIG. 2) responds to the trigger and invokes the selector module which in turn invokes the presentation module which presents clipping mode selection options, such as the semi-automatic clipping mode and the manual clipping mode. If the user chooses the manual clipping mode, then the selector module re-invokes the presentation module to give choices on the manual clipping modes on a device which may receive multiple types of input. In one example, the user may choose the manual mode with start point change through a voice input. A user interface for said choices is not required on a device which inherently receives voice inputs. Then, the presentation module communicates with the frame grabber module to provide frame thumbnails with a start point, as shown in FIG. 16. The frame grabber module accesses the configuration file and receives thumbnail related information, such as information of thumbnail size, time difference between thumbnails, and number of thumbnails to be shown. The frame grabber module based on the start point and the configuration file information generates a time strip for which frame thumbnails are required. Based on time on the time strip, the frame grabber module communicates with the buffer module and requests for the frames for those time stamps. The buffer module provides those frames to the frame grabber module which are then converted into thumbnails. These thumbnails are given to the presentation module for displaying to the user for selection of the desired start point.

FIG. 16 illustrates a user interface for manual clipping in a voice input mode according to an embodiment of the present disclosure.

Referring to FIG. 16, a graphical user interface 1600 for a manual mode with start point change through voice is illustrated. As shown, thumbnails 1601, 1602, 1603, 1604, and 1605 are displayed in such a way that a current start point frame 1603 is in the center of the thumbnail strip and is highlighted and navigational arrows 1606 on both the sides of the strip are shown.

The user may provide input through a microphone which may be enabled by a voice input interface 1607 in order to select the start frame by navigating the thumbnail strip. The time of selected frame is communicated to a frame grabber module (e.g., 204 in FIG. 2) for generating a fresh time strip and thumbnails. The above processes are repeated until the start point is not freezed or the clipping operation is cancelled by the user.

Upon freezing the start point, the start point is communicated by a presentation module (e.g., 202 in FIG. 2) to a selector module 201 in FIG. 2). The selector module manipulates the input (if required) to generate the start point and invokes a clipping module (e.g., 205 in FIG. 2) with the start and end points for clip generation. The clipping module extracts the predefined storage location from a configuration file (e.g., 206 in FIG. 2) and dumps the multimedia clip at the predefined storage location. Alternatively, the multimedia clip is stored at a user-specified storage location, which is received from the user in the fly. If the user cancels the clipping operation, then the configuration file retains the previous values.

Figure 17:
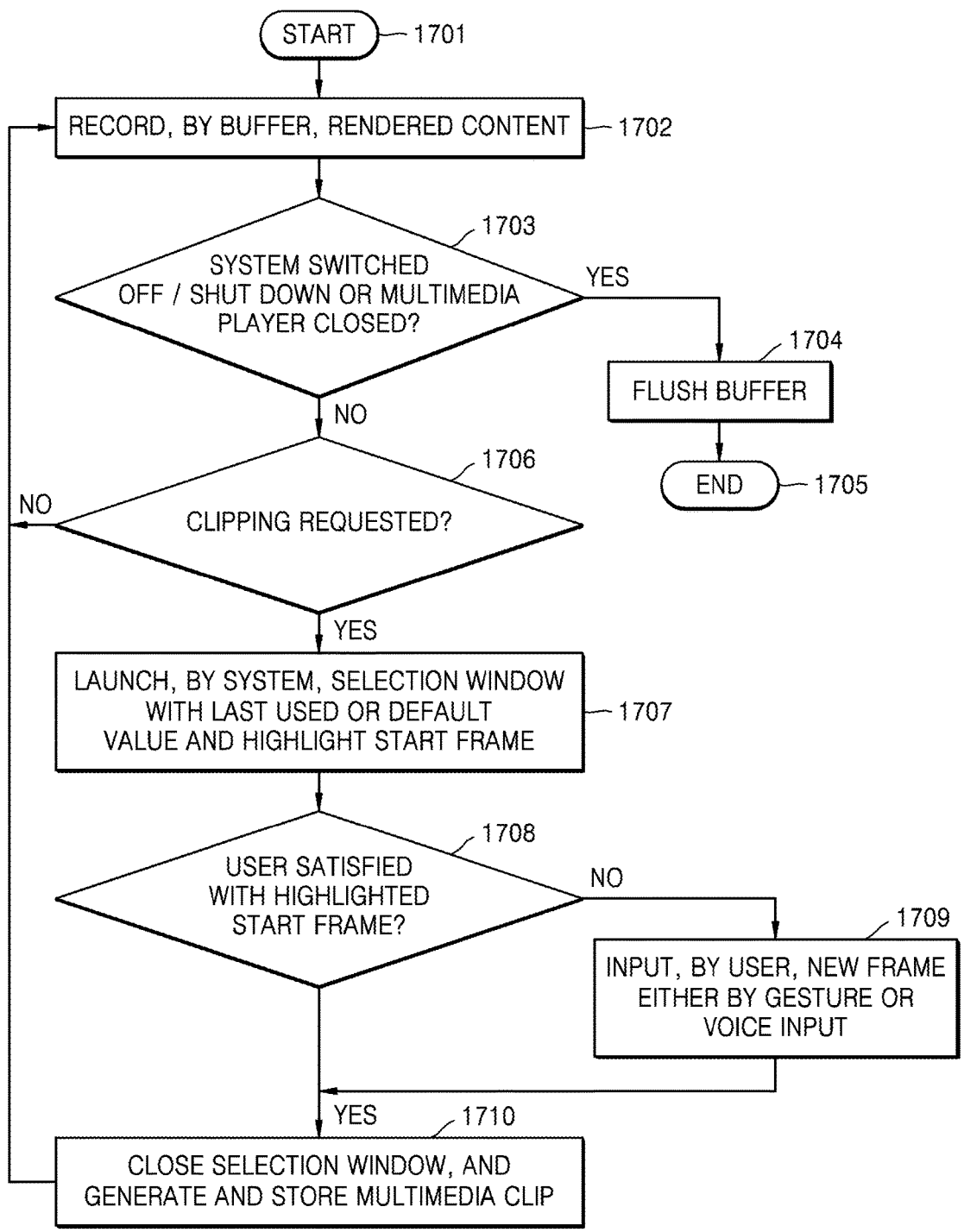
FIG. 17 illustrates a flowchart depicting manual clipping in a gesture or voice input mode according to an embodiment of the present disclosure.

FIG. 17 illustrates a flowchart depicting a manual clipping mode with a gesture or voice input according to an embodiment of the present disclosure.

Referring to FIG. 17, after start in operation 1701, the buffer starts recording, based on instructions of the system or the multimedia player, a currently playing portion of the multimedia content as per its capacity in operation 1702. It is to be noted here that the buffer is deactivated when the multimedia content is not played. Anytime during operation if the system is switched off/shut down or the multimedia player is closed in operation 1703, then the buffer is flushed in operation 1704, and the clipping process is terminated in operation 1705. When clipping is triggered by the user in operation 1706, the system launches a selection window with a last used or default value and highlights the start frame in operation 1707. The time or frame at which trigger is received is designated as the end point of the multimedia clip. If the user is not satisfied with the default start point in operation 1708, then, in operation 1709, the start point of the clip is received the user in form of a gesture input or a voice input in the selection window as explained above in conjunction with FIGS. 15 and 16. Till the time the user is satisfied with the starting time or frame in operation 1708, the user may select the start point through a gesture input or voice input in operation 1709. Once the user is satisfied in operation 1708, the selection window is closed in operation 1710. After that the selection window is closed in operation 1710 and the stored portion of the multimedia content that is within the start point and the end point is retrieved to generate the multimedia clip. The multimedia clip is stored at a predefined location as specified in the configuration file or at a user-specified location provided on the fly. In this way, only three inputs are received from the user; one is just to start the clipping process, another to select a desired type of manual mode, and another is to provide the start point for the multimedia clip through a gesture or voice input. Further, the multimedia clip is generated without interrupting the playback of the multimedia content and without requiring any other inputs from the user.

Figure 18:
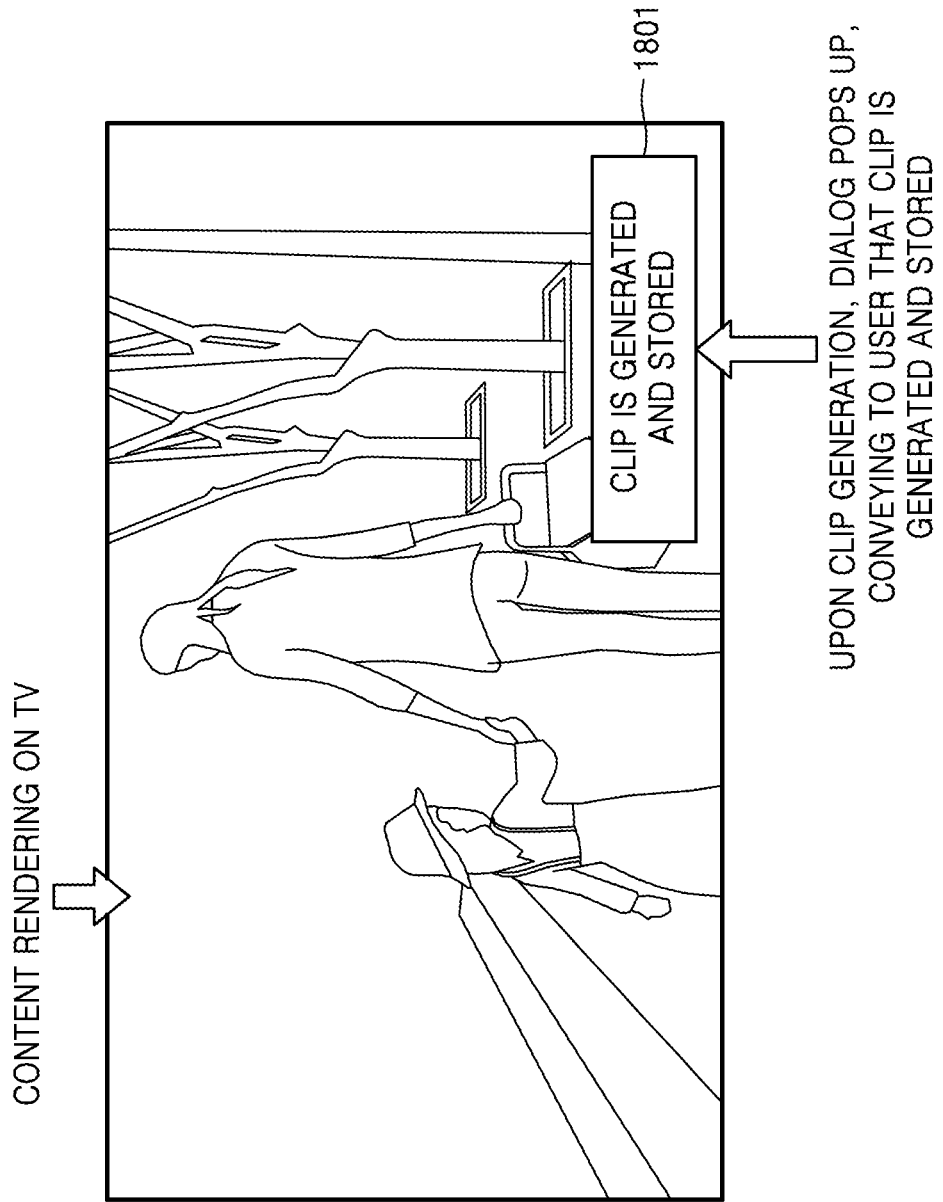
FIG. 18 illustrates a user interface for notifying a clip generation status to a user according to an embodiment of the present disclosure.

FIG. 18 illustrates a user interface for notifying a clip generation status to the user according to an embodiment of the present disclosure.

Referring to FIG. 18 this status may be shown to the user through a small dialog pop-up 1801 while the multimedia content is being rendered on an output device, such as a television.

Figure 19:
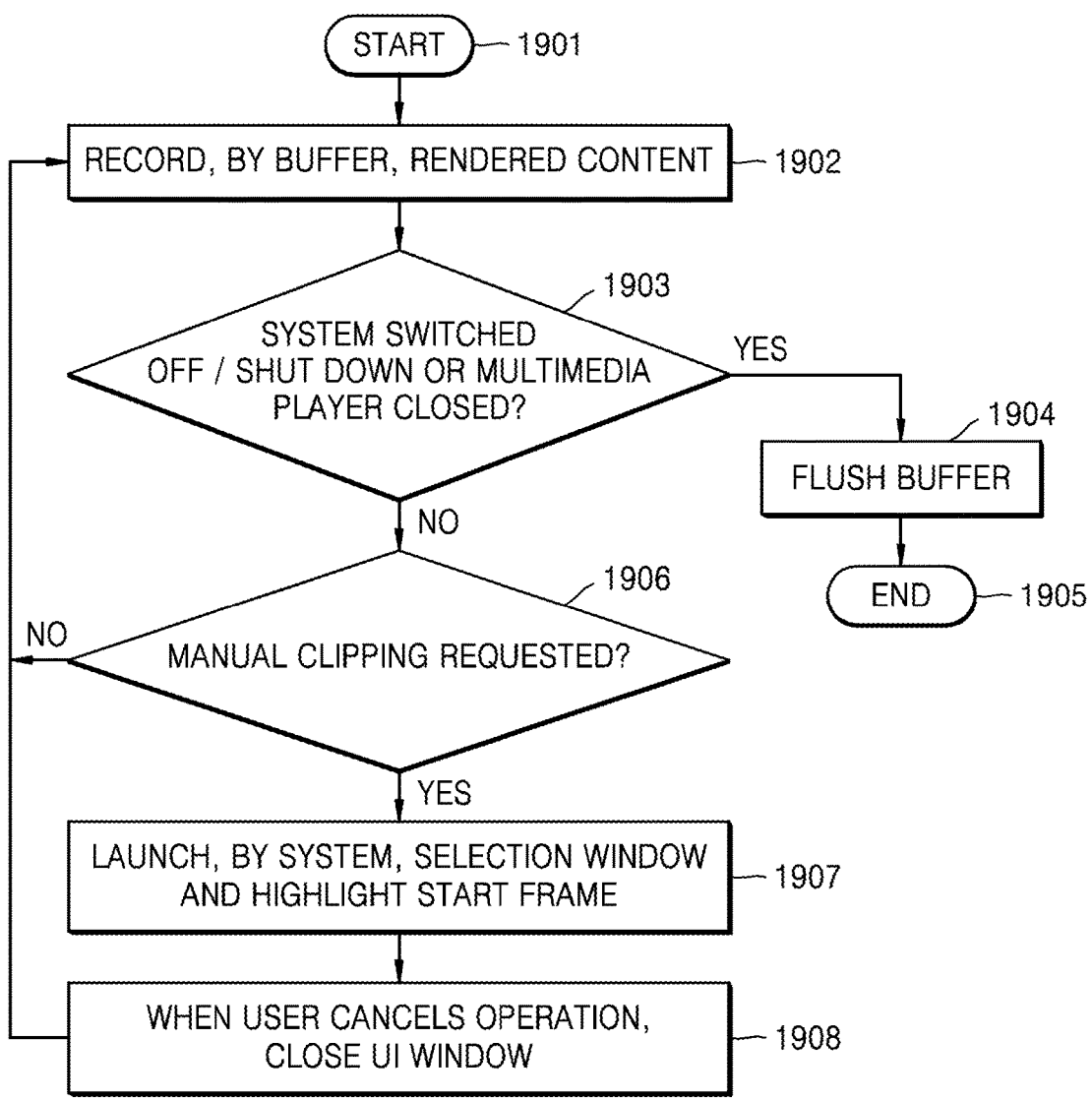
FIG. 19 illustrates a flowchart depicting a clipping operation that is cancelled by a user according to an embodiment of the present disclosure.

FIG. 19 illustrates a flowchart depicting a clipping operation that is cancelled by a user according to an embodiment of the present disclosure.

Referring to FIG. 19, after start in operation 1901, the buffer starts recording, based on the instructions of the system or the multimedia player, a currently playing portion of the multimedia content as per its capacity in operation 1902. It is to be noted here that the buffer is deactivated when the multimedia content is not played. Anytime during operation if the system is switched off/shut down or the multimedia player is closed in operation 1903, then the buffer is flushed in operation 1904, and the clipping process is terminated in operation 1905. When clipping is triggered by the user, an external sensor (e.g., 207 in FIG. 2), or an internal sensor (e.g., 106 in FIG. 1) in operation 1906, the system launches a UI in operation 1907. In operation 1908, the user cancels the operation at any moment and the UI closes the selection window, but the buffer may continue recording the currently playing portion of the multimedia content for generating another multimedia clip subsequently.

Figure 20:
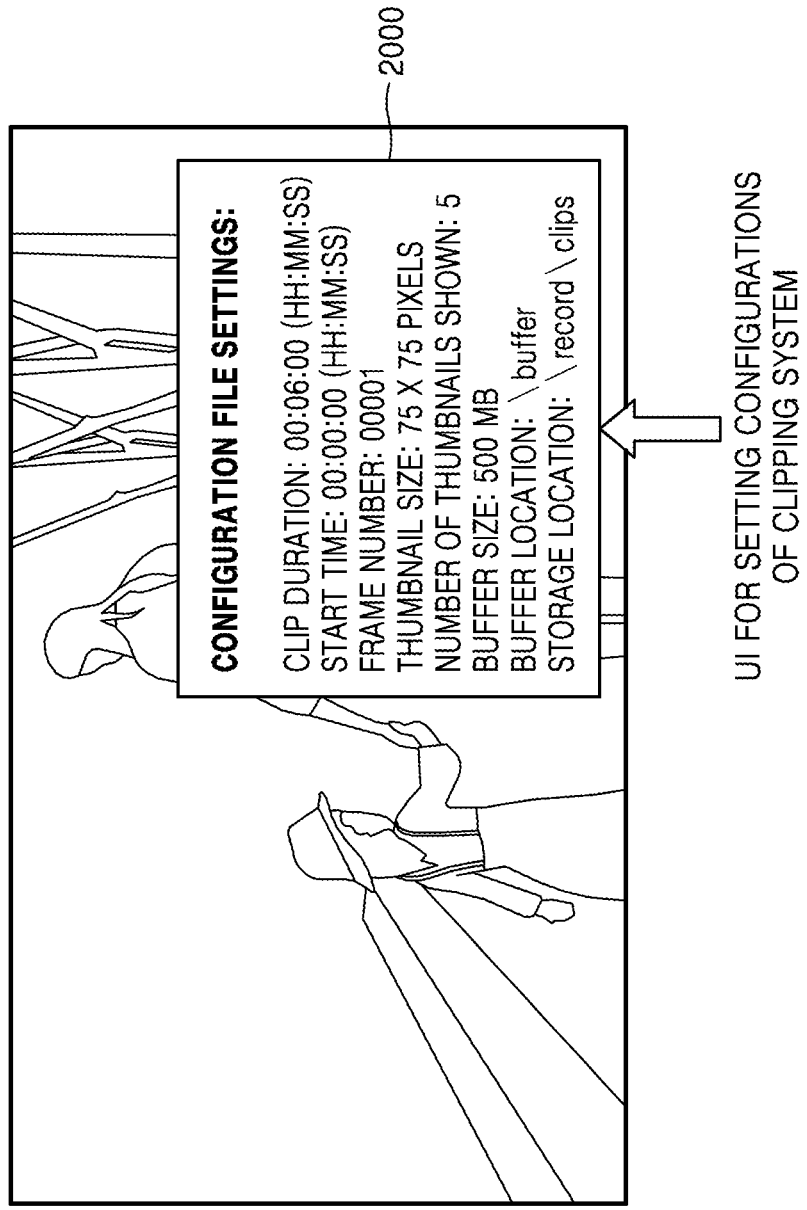
FIG. 20 illustrates a user interface for configuration of file settings according to an embodiment of the present disclosure.

FIG. 20 illustrates a user interface for configuration of file settings according to an embodiment of the present disclosure.

Referring to FIG. 20, through a UI 2000, the user may edit various configurations for a clipping process. For example, the user may edit a predefined duration for the clip, a thumbnail size, a time difference between thumbnails, a number of thumbnails to be shown, a buffer size, a buffer location, a predefined storage location, and a URL along with credentials for direct upload on a social networking website.

Figure 21:
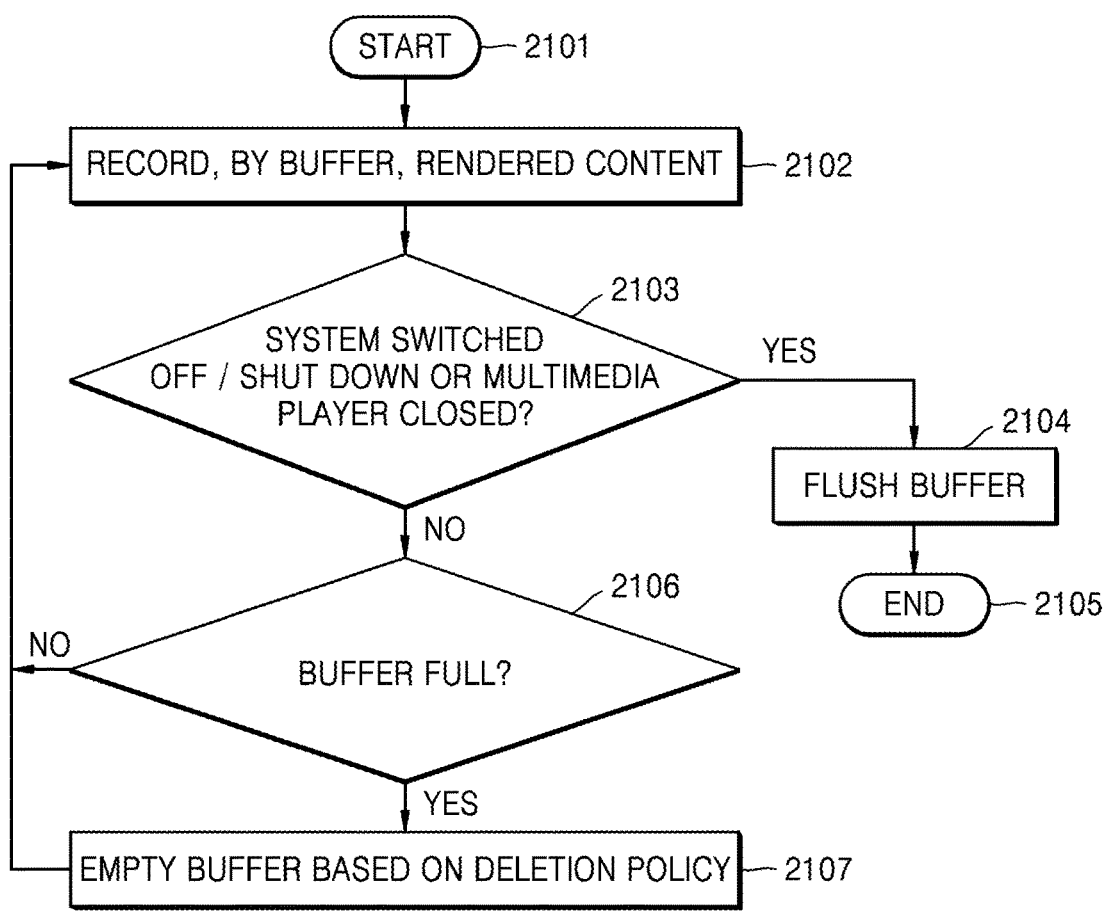
FIG. 21 illustrates a flowchart depicting buffer management according to an embodiment of the present disclosure.

FIG. 21 illustrates a flowchart for a buffer management process according to an embodiment of the present disclosure.

Referring to FIG. 21, after start in operation 2101, the buffer starts recording the multimedia content being played at a buffer location and depending upon buffer size as specified in a configuration file (e.g., 206 in FIG. 2), in operation 2102. The buffering starts based on the instructions of multimedia player, or based on the instructions of system. Anytime during operation if the system is switched off/shut down or the multimedia player is closed in operation 2103, then the buffer is flushed in operation 2104, and the process is terminated in operation 2105. However, when the system remains switched on, then it is continuously observed, in operation 2106, whether the buffer is full at any time. If the buffer gets full, then the buffer is emptied based on a deletion policy, such as FIFO, in operation 2107, otherwise the buffer may continue recording the multimedia content in a remaining space of the buffer in operation 2102. After deletion also, the buffer may continue recording the multimedia content in the freed space of the buffer in operation 2102.

Advantages of the embodiments of present disclosure include, but are not limited to generation of multimedia clips having live/broadcasted/streaming or stored/recorded content without interrupting multimedia playback and with no or minimal user inputs, thus providing good user experience and making multimedia clip generation process faster. At the same time, the present disclosure provides freedom to the user to provide overriding instructions.

Embodiments of the present disclosure may be used on any multimedia content for any digital device which is capable of rendering the multimedia content. The digital device may be a tablet, a mobile device, a TV, etc. and the multimedia content may be audio and/or video. The memory used for the purpose of buffering and final storage may be located on the device or on an external memory which is available on the secondary device connected with it. The secondary device may be a set-top box, a pen drive, a hard disk, etc.

While certain embodiments of the present disclosure have been illustrated and described herein, it is to be understood that the present disclosure is not limited thereto, but may be otherwise variously embodied and practiced within the scope of the following claims.

An embodiment of the present disclosure may also be realized in a form of a non-transitory computer-readable recording medium, such as a program module executed by a computer. A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

The computer-readable recording medium may also be distributed over network coupled computer systems so that the computer-readable code is stored and executed in a distributed fashion.

The particular implementations shown and described herein are illustrative examples of the disclosure and are not intended to otherwise limit the scope of the disclosure in any way. For the sake of brevity, electronics of the related art, control systems, software development and other functional aspects of the systems (and components of the individual operating components of the systems) may not be described in detail.

While the various embodiments of the present disclosure have been particularly shown and described with reference to various embodiments of the present disclosure thereof, it will be understood by those of ordinary skill in the art that various changes in form and details may be made therein without departing from the spirit and scope of the present disclosure as defined by the following claims. Hence, it will be understood that the various embodiments of the present disclosure described above are not limiting the scope of the disclosure. For example, each component described in a single type may be executed in a distributed manner, and components described distributed may also be executed in an integrated form.

The use of any and all examples, or language (e.g., "etc.") provided herein, is intended merely to better illuminate the disclosure and does not pose a limitation on the scope of the disclosure unless otherwise claimed.

Moreover, no item or component is essential to the practice of the disclosure unless the element is specifically described as "essential" or "critical".

While the present disclosure has been particularly shown and described with reference to various embodiments of the present disclosure thereof, it will be understood by those of ordinary skill in the art that various changes in form and details may be made therein without departing from the spirit and scope of the present disclosure as defined by the appended claims.

The various embodiments of the present disclosure should be considered in a descriptive sense only and not for purposes of limitation. Therefore, the scope of the disclosure is defined not by the detailed description of the disclosure but by the appended claims, and all differences within the scope will be construed as being included in the present disclosure.

In the following description, terms such as "unit" and "module" indicate a unit for processing at least one function or operation, wherein the unit and the block may be embodied as hardware or software or embodied by combining hardware and software. The "unit" may be formed so as to be in an addressable storage medium, or may be formed so as to operate one or more processors.

Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables.

In the present disclosure, an expression "A may include one of a1, a2, and a3" widely means that elements that may be included in the element A are a1, a2, and a3.

Thus, elements that may form the element A are not necessarily limited to a1, a2, and a3. Thus, such an expression should not be exclusively interpreted that the element A only includes a1, a2, and a3.

Also, such an expression means that the element A may include a1, may include a2, or may include a3. The expression does not mean that the elements forming the element A are definitely selectively determined within a certain group. For example, the expression should not be interpreted that the element A necessarily includes a1, a2, or a3 selected from the group consisting of a1, a2, and a3.

Also, in the present disclosure, an expression "at least one of a1, a2, and a3" denotes one of "a1", "a2", "a3", "a1 and a2", "a1 and a3", "a2 and a3", and "a1, a2, and a3".

Accordingly, unless it is explicitly stated "at least one of a1, at least one of a2, and (or) at least one of a3", the expression "at least one of a1, a2, and a3" should not be interpreted as "at least one of a1", "at least one of a2" and (or) "at least one of a3".

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of generating a multimedia clip from multimedia content, the method comprising:
   activating a buffer in response to a command of executing a multimedia player for reproducing multimedia content;
   controlling the buffer to store the reproduced multimedia content;
   detecting a user input;
   in response to the detecting of the user input, determining a time or a frame when the user input is detected as an end point of the multimedia clip;
   generating the multimedia clip by extracting a portion of the multimedia content, from the multimedia content stored in the buffer, between the end point and a start point of the multimedia clip which is determined based on the end point using a predefined duration of the multimedia clip; and
   deactivating the buffer in response to a command for terminating the multimedia player,
   wherein the steps of the detecting, the determining of the end point, and the generating are performed without pausing or stopping reproduction of the multimedia content while the multimedia content is being reproduced.

2. The method of claim 1, further comprising obtaining a signal from at least one of an external sensor or an internal sensor.

3. The method of claim 2, wherein the determining of the end point comprises determining the end point based on the signal obtained from the at least one of the external sensor or the internal sensor.

4. The method of claim 1, wherein the start point is determined by computing the start point by using the end point and the predefined duration of the multimedia clip.

5. The method of claim 1,
   wherein the determining of the start point comprises determining the start point based on an input received from a user interface.

6. The method of claim 1, wherein the user input comprises at least one of a text input, a gesture input, or a voice input.

7. A non-transitory computer-readable recording medium having recorded thereon a program, which when executed by a computer, performs the method of claim 1.

8. A device for generating a multimedia clip from multimedia content, the device comprising:
   a detector configured to detect a user input; and
   a controller configured to:
      activate a buffer in response to a command of executing a multimedia player for reproducing multimedia content,
      control the buffer to store the reproduced multimedia content,
      in response to the detecting of the user input, determine a time or a frame when the user input is detected as an end point of the multimedia clip,
      generate the multimedia clip by extracting a portion of the multimedia content, from the multimedia content stored in the buffer, between the end point and a start point of the multimedia clip which is determined based on the end point using a predefined duration of the multimedia clip, and
      deactivate the buffer in response to a command for terminating the multimedia player,
   wherein the detecting, the determining of the end point, the determining of the start point, and the generating are performed without pausing playback of the multimedia content while the multimedia is being played.

9. The device of claim 8, wherein the controller is further configured to obtain a signal from at least one of an external sensor or an internal sensor comprised in the detector.

10. The device of claim 9, wherein the controller is further configured to determine the end point based on the signal obtained from the at least one of the external sensor or the internal sensor comprised in the detector.

11. The device of claim 8, wherein the controller is further configured to compute the start point by using the end point and the predefined duration of the multimedia clip.

* * * * *